US008999282B2

(12) United States Patent
Ceder et al.

(10) Patent No.: US 8,999,282 B2
(45) Date of Patent: Apr. 7, 2015

(54) CARBOPHOSPHATES AND RELATED COMPOUNDS

(75) Inventors: Gerbrand Ceder, Wellesley, MA (US); Hailong Chen, Cambridge, MA (US); Robert E. Doe, Brighton, MA (US); Geoffroy Hautier, Somerville, MA (US); Anubhav Jain, Cambridge, MA (US); ByoungWoo Kang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 335 days.

(21) Appl. No.: 13/579,202

(22) PCT Filed: Feb. 22, 2011

(86) PCT No.: PCT/US2011/025684
§ 371 (c)(1),
(2), (4) Date: Dec. 12, 2012

(87) PCT Pub. No.: WO2011/103554
PCT Pub. Date: Aug. 25, 2011

(65) Prior Publication Data
US 2013/0089486 A1    Apr. 11, 2013

Related U.S. Application Data

(60) Provisional application No. 61/306,670, filed on Feb. 22, 2010.

(51) Int. Cl.
*C01B 25/45*         (2006.01)
*H01M 4/525*         (2010.01)
(Continued)

(52) U.S. Cl.
CPC ............... *H01M 4/525* (2013.01); *C01B 25/16* (2013.01); *C01B 25/45* (2013.01); *H01M 4/5825* (2013.01);
(Continued)

(58) Field of Classification Search
CPC ...................................... H01M 4/5825
USPC ........................................ 423/306
See application file for complete search history.

(56) References Cited

U.S. PATENT DOCUMENTS 6,136,472 A    10/2000    Barker et al.
6,391,493 B1    5/2002    Goodenough et al.
(Continued)

FOREIGN PATENT DOCUMENTS

CA       2 568 211 A1     7/2001
EP       1 826 860 A1     8/2007
WO    WO 2008/107571 A2   9/2008

OTHER PUBLICATIONS

International Search Report and Written Opinion for Application No. PCT/US2011/025684 mailed Jul. 27, 2011.
(Continued)

*Primary Examiner* — Anthony J Zimmer
*Assistant Examiner* — Justin Bova
(74) *Attorney, Agent, or Firm* — Wolf, Greenfield & Sacks, P.C.

(57) ABSTRACT

The present invention generally relates to carbophosphates and other compounds. Such compounds may be used in batteries and other electrochemical devices, or in other applications such as those described herein. One aspect of the invention is generally directed to carbophosphate compounds, i.e., compounds containing carbonate and phosphate ions. For example, according to one set of embodiments, the compound has a formula $A_x(M)(PO_4)_a(CO_3)_b$, where M comprises one or more cations. A may include one or more alkali metals, for example, lithium and/or sodium. In some cases, x is greater than about 0.1, a is between about 0.1 and about 5.1, and b is between about 0.1 and about 5.1. In certain embodiments, the compound may have a unit cell atomic arrangement that is isostructural to unit cells of the minerals sidorenkite, bonshtedtite, bradleyite, crawfordite, or ferrotychite. In some embodiments, the compound may have a formula $A_x(M)(YO_4)_a(XO_3)_b$, where A comprises one or more alkali metals, M comprises one or more cations, X includes B, C, and/or N, and Y includes Si, P, As, S, V, Nb, Mo, and/or W. In some cases, x is greater than about 0.1, a is between about 0.1 and about 5.1, and b is between about 0.1 and about 5.1. Other aspects of the invention are generally directed to techniques for making or using such compounds, kits involving such compounds, and the like.

8 Claims, 10 Drawing Sheets

(51) Int. Cl.
| | |
|---|---|
| C01B 25/16 | (2006.01) |
| H01M 4/58 | (2010.01) |
| H01M 4/505 | (2010.01) |
| H01M 10/052 | (2010.01) |
| H01M 10/054 | (2010.01) |

(52) U.S. Cl.
CPC ............ *H01M 4/505* (2013.01); *H01M 10/052* (2013.01); *H01M 10/054* (2013.01); *Y02T 10/7011* (2013.01)

(56) References Cited

U.S. PATENT DOCUMENTS

| | | | |
|---|---|---|---|
| 6,528,033 | B1 | 3/2003 | Barker et al. |
| 2003/0190526 | A1 | 10/2003 | Saidi et al. |
| 2006/0191614 | A1* | 8/2006 | Wu .................................. 149/46 |
| 2008/0153002 | A1 | 6/2008 | Nazar et al. |
| 2008/0241043 | A1 | 10/2008 | Barker et al. |

OTHER PUBLICATIONS

International Preliminary Report on Patentability for Application No. PCT/US2011/025684 mailed Sep. 7, 2012.

Allen et al., LiMBO3 (M=Fe, Mn): Potential cathode for lithium ion batteries. Mat. Res. Soc. Symp. Proc. Jan. 1, 2002;730:VI.8.1-.6.

Ceder et al., Carbonophosphates: a new family of cathode materials for Li-ion battery discovered by high-throughput ab initio computing. 218$^{th}$ Electrochemical Society Meeting. Las Vegas, USA. Oct. 2010. Abstract.

Chen et al., A new family of cathode materials for lithium ion batteries: the carbophosphates. 15$^{th}$ International Meeting on Lithium Batteries. Montreal, Canada. Jun. 2010. Poster.

Chen et al., A novel carbophosphate compound as cathode material for Lithium-ion batteries. 15$^{th}$ International Meeting on Lithium Batteries. Montreal, Canada. Jun. 2010. Abstract.

Curtarolo et al., Predicting crystal structures with data mining of quantum calculations. Phys Rev Lett. Sep. 26, 2003;91(13):135503. 1-.4. Epub Sep. 24, 2003.

Dong et al., The structure and electrochemical performance of LiFeBO3 as a novel Li-battery cathode material. Electrochimica Acta. Jan. 2008;53(5):2339-45.

Fischer et al., Predicting crystal structure by merging data mining with quantum mechanics. Nat Mater. Aug. 2006;5(8):641-6. Epub Jul. 9, 2006.

Godshall et al., Relationships among electrochemical, thermodynamic, and oxygen potential quantities in Lithium-transition metal-oxygen molten salt cells. J Electrochem Soc. Mar. 1984;131(3):543-9.

Hautier et al., A high-throughput computational search for new Lithium-ion battery cathode materials. Summer School on Computational Materials Science. San Sebastian, Spain. Jun. 2010.

Hautier et al., High-throughput ab initio computations for accelerated new materials discovery. Electronic structure challenges in materials modeling for energy applications. CECAM workshop. Lausanne, Switzerland. Jun. 2010. 59 pages.

Legagneur et al., LiMBO3 (M=Mn, Fe, Co): synthesis, crystal structure and lithium deinsertion/insertion properties. Solid State Ionics. Jan. 2001;139(1-2):37-46.

Moore et al., Li diffusion in novel cathode materials through a scalable combined empirical potential and ab-initio method. 218$^{th}$ Electrochemical Society Meeting. Las Vegas, USA. Oct. 2010. Abstract.

Morgan et al., Li conductivity in LixMPO4 M = (Mn, Fe, Co, Ni) olivine materials. Electrochemical and Solid State Letters. 2004;7(2): A30-A32. (The year of publication is sufficiently earlier than the effective U.S. filing date and any foreign priority date so that the particular month of publication is not in issue. See MPEP 609. 04(a)).

Nishimura et al., Experimental visualization of lithium diffusion in LixFePO4. Nat Mater. Sep. 2008;7(9):707-11.

Sokolova et al., Crystal structure of a new bradleyite-group mineral Na3Sr Po4(Co3). Soviet Physics. Jan. 1992;37(1):14-6.

\* cited by examiner

CARBOPHOSPHATES AND RELATED COMPOUNDS

RELATED APPLICATIONS

This application is a national stage filing under 35 U.S.C. §371 of International PCT Application No. PCT/US2011/025684, filed Feb. 22, 2011, entitled "Carbophosphates and Related Compounds," by Ceder et al., which claims the benefit under 35 U.S.C. §119(e) of U.S. Provisional Patent Application Ser. No. 61/306,670, filed Feb. 22, 2010, entitled "Carbophosphate and Related Compounds," by Ceder, et al., each of which are incorporated herein by reference.

FIELD OF INVENTION

The present invention generally relates to carbophosphates and other compounds, e.g., for use in batteries and other applications.

BACKGROUND

Demand for lightweight, high energy density batteries, for example, to power vehicles or portable electronic devices, continues to rise. However, although many compounds have been studied for use in batteries and other applications, it remains difficult to identify compounds having good characteristics of thermal stability and/or high energy densities. Accordingly, improvements in compounds for use in batteries and other applications are still needed.

SUMMARY OF THE INVENTION

The present invention generally relates to carbophosphates and other compounds, e.g., for use in batteries and other applications. The subject matter of the present invention involves, in some cases, interrelated products, alternative solutions to a particular problem, and/or a plurality of different uses of one or more systems and/or articles.

Compounds with polyanionic groups are generally more stable than oxides. In some cases, they may release less $O_2$ at elevated temperatures, which could be an important safety feature for certain applications such as lithium ion batteries. In addition, to lower the weight, lower-weight polyanionic groups such as carbonate and borate groups may be useful, e.g., for higher energy and power densities. Thus, some aspects of the invention are directed to carbonate groups and/or multi-polyanionic groups, for example, carbonate-phosphates or silicate-carbonates.

In one aspect, the present invention is directed to a compound. In accordance with one set of embodiments, the compound has a formula:

$$Li_x(M)(PO_4)_a(CO_3)_b,$$

where M comprises one or more non-alkali metal cations, x is greater than about 0.1, a is between about 0.1 and about 5.1, and b is between about 0.1 and about 5.1. In some cases, at least about 25 mol % of M comprises one or more non-alkali/non-alkaline earth metals.

The compound, in another set of embodiments, has a formula:

$$A_x(M)(PO_4)_a(CO_3)_b,$$

where A comprises one or more alkali metals, M comprises one or more non-alkali metal cations, x is greater than about 0.1, a is between about 0.1 and about 5.1, and b is between about 0.1 and about 5.1. In certain cases, at least about 25 mol % of M comprises one or more non-alkali/non-alkaline earth metals. In some embodiments, the compound is not one where, when A is Na, x is between 2 and 4, and M is Fe, Mg, Mn, or Sr.

In accordance with one set of embodiments, the compound has a formula:

$$A_x(M)(YO_4)_a(XO_3)_b,$$

where A comprises one or more alkali metals; M comprises one or more non-alkali metal cations; X comprises one or more of B, C, or N; Y comprises one or more of Si, P, As, or S; x is greater than about 0.1; a is between about 0.1 and about 5.1; and b is between about 0.1 and about 5.1. In some instances, at least about 25 mol % of M comprises one or more non-alkali/non-alkaline earth metals. In some embodiments, the composition does not include any of the following combinations for A, M, Y, and X, respectively: Na, Al and Co, Si, N; Na, Fe, Si, B; Na, Al and Co, Si, C; Na, Mn, P, C; Na, Fe, P, C; Na, Co, P, B; Na, Mg and Fe, S, C; Na, Fe, S, C; Li, Cu, P, B; and Li, Zn, P, B.

The compound, in another set of embodiments, has a formula:

$$A_x(M)(YO_4)_a(XO_3)_b,$$

where A comprises one or more alkali metals; M comprises one or more non-alkali metal cations; X comprises one or more of B, C, or N; Y comprises one or more of V, Nb, Mo, and W; x is greater than about 0.1; a is between about 0.1 and about 5.1; and b is between about 0.1 and about 5.1. In one embodiment, at least about 25 mol % of M comprises one or more non-alkali/non-alkaline earth metals. In some cases, M does not comprise V, Nb, Mo, or W. In some instances, the composition does not include any of the following combinations for A, M, Y, and X, respectively: Na, Al and Co, Si, N; Na, Fe, Si, B; Na, Al and Co, Si, C; Na, Mn, P, C; Na, Fe, P, C; Na, Co, P, B; Na, Mg and Fe, S, C; Na, Fe, S, C; Li, Cu, P, B; and Li, Zn, P, B.

In yet another set of embodiments, the compound has a formula:

$$A_x(M)(PO_4)_a(CO_3)_b,$$

where A comprises one or more alkali metals; M comprises one or more non-alkali metal cations; x is greater than about 0.1; a is between about 0.1 and about 5.1; and b is between about 0.1 and about 5.1. In some cases, the compound is not $Na_3Fe(PO_4)(CO_3)$, $Na_3Mg(PO_4)(CO_3)$, $Na_3Mn(PO_4)(CO_3)$, or $Na_3Sr(PO_4)(CO_3)$. In some embodiments, at least about 25 mol % of M comprises one or more non-alkali/non-alkaline earth metals.

The compound, in another set of embodiments, has a formula:

$$A_x(M)(YO_4)_a(XO_3)_b,$$

where A comprises one or more alkali metals; M comprises one or more non-alkali metal cations; X is selected from the group consisting of B, C, or N; Y is selected from the group consisting of Si, P, As, S, V, Nb, Mo, or W; x is greater than about 0.1; a is between about 0.1 and about 5.1; and b is between about 0.1 and about 5.1. In some embodiments, at least about 10 mol % of M comprises one or more non-alkali/non-alkaline earth metals. In some cases, the compound is thermodynamically unstable at 25° C. and 1 atm. In some embodiments, at least about 25 mol % of M comprises one or more non-alkali/non-alkaline earth metals.

The compound, in yet another set of embodiments, has a formula:

$$A_x(M)(YO_4)_a(XO_3)_b,$$

where A comprises one or more alkali metals; M comprises one or more non-alkali metal cations; X is selected from the group consisting of B, C, or N; Y is selected from the group consisting of Si, P, As, S, V, Nb, Mo, or W; x is greater than about 0.1; a is between about 0.1 and about 5.1; and b is between about 0.1 and about 5.1. In some cases, the compound is not $Na_3FePO_4CO_3$, $Na_3MnPO_4CO_3$, $Na_6Fe_2SO_4(CO_3)_4$, $NaH_6Co(PO_4)_2BO_3$, $Al_{12}CO_4(NO_3)_2Na_4(SiO_4)_{12}$, or $Fe_9H_2Na(SiO_4)_6(BO_3)_3$. In some embodiments, at least about 25 mol % of M comprises one or more non-alkali/non-alkaline earth metals.

In yet another set of embodiments, the compound is a lithium-containing compound having a unit cell atomic arrangement that is isostructural to a sidorenkite unit cell, a bonshtedtite unit cell, a bradleyite unit cell, a crawfordite unit cell, or a ferrotychite unit cell. In still another set of embodiments, the compound is a lithium-containing compound comprising at least about 25 mol % lithium, the compound having a unit cell containing $CO_3$ triangular planar groups, $PO_4$ tetrahedral groups, and $MO_6$ octahedral groups, where M is a positive cation. The compound, in accordance with yet another set of embodiments, has an XRD diffraction pattern having maxima at 2 thetas of 10.7±1, 20.4±1, 21.4±1, 27.1±1, 28.8±1, 34.0±1, and 35.8±1 degrees, where the XRD is acquired using an X-ray diffractometer having a copper K alpha source with a wavelength of 1.5418 angstrom.

In another aspect, the present invention is generally directed to a compound having a triclinic (P1) crystal structure. In accordance with one set of embodiments, the compound has a formula:

$A_x(M)(PO_4)_a(CO_3)_b$, where A comprises one or more alkali metals, M comprises one or more non-alkali metal cations, x is greater than about 0.1, a is between about 0.1 and about 5.1, and b is between about 0.1 and about 5.1. In some cases, at least about 25 mol % of M comprises one or more non-alkali/non-alkaline earth metals.

The compound, in another set of embodiments, has a formula:

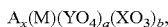

$A_x(M)(YO_4)_a(XO_3)_b$, where A comprises one or more alkali metals; M comprises one or more non-alkali metal cations; X comprises one or more of B, C, or N; Y comprises one or more of Si, P, As, or S; x is greater than about 0.1; a is between about 0.1 and about 5.1; and b is between about 0.1 and about 5.1. In certain embodiments, at least about 25 mol % of M comprises one or more non-alkali/non-alkaline earth metals.

In accordance with yet another set of embodiments, the compound has a formula:

$A_x(M)(YO_4)_a(XO_3)_b$, where A comprises one or more alkali metals; M comprises one or more non-alkali metal cations; X comprises one or more of B, C, or N; Y comprises one or more of V, Nb, Mo, and W; x is greater than about 0.1; a is between about 0.1 and about 5.1; and b is between about 0.1 and about 5.1. In some cases, at least about 25 mol % of M comprises one or more non-alkali/non-alkaline earth metals. In certain embodiments, M does not comprise V, Nb, Mo, or W.

In still another aspect, the present invention is directed to an electrochemical device. In accordance with one set of embodiments, the electrochemical device comprises n electrode comprising a lithium-containing compound. In certain embodiments, the compound may have a formula:

$Li_x(M)(PO_4)_a(CO_3)_b$, where M comprises one or more non-alkali metal cations, x is greater than about 0.1, a is between about 0.1 and about 5.1, and b is between about 0.1 and about 5.1. In certain instances, at least about 25 mol % of M comprises one or more non-alkali/non-alkaline earth metals. In some cases, the lithium-containing compound has a unit cell containing $CO_3$ triangular planar groups, $PO_4$ tetrahedral groups, and/or $MO_6$ octahedral groups.

In accordance with another set of embodiments, the electrochemical device comprises an electrode comprising a compound having a formula:

$A_x(M)(PO_4)_a(CO_3)_b$, where A comprises one or more alkali metals, M comprises one or more metal cations having more than one oxidation state above the ground state, x is greater than about 0.1, a is between about 0.1 and about 5.1, and b is between about 0.1 and about 5.1. In some instances, at least about 25 mol % of M comprises one or more non-alkali/non-alkaline earth metals.

The electrochemical device, in another set of embodiments, comprises an electrode comprising a compound having a formula:

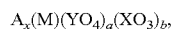

$A_x(M)(YO_4)_a(XO_3)_b$, where A comprises one or more alkali metals; M comprises one or more non-alkali metal cations; X is selected from the group consisting of B, C, or N; Y is selected from the group consisting of Si, P, As, S, V, Nb, Mo, or W; x is greater than about 0.1; a is between about 0.1 and about 5.1; and b is between about 0.1 and about 5.1. In some cases, at least about 25 mol % of M comprises one or more non-alkali/non-alkaline earth metals.

In yet another set of embodiments, the electrochemical device comprises an electrode comprising a compound such as those described herein. For example, the compound may be a lithium-containing compound or a sodium-containing compound.

In some embodiments, the compound has an energy density of at least about 100 mA h/g. In certain embodiments, the compound comprises at least two different polyanionic groups. In some cases, the compound does not substantially decompose upon exposures to temperatures of at least about 250° C. The compound, in some instances, contains no more than about 5 mol % of anionic oxide. In still another set of embodiments, the compound does not exhibit a thermal transition below 300° C. when analyzed using differential scanning calorimetry (DSC). In some cases, the compound releases no more than 1 ml/g of oxygen when heated to a temperature of 250° C.

Yet another aspect of the present invention is directed to a method. In one set of embodiments, the method includes the acts of providing an aqueous liquid comprising a phosphate anion, a carbonate anion, an alkali metal cation, and a non-alkali metal cation; exposing the liquid to a controlled temperature of at least about 70° C.; and removing water from the liquid to recover a solid product.

In another set of embodiments, the present invention is directed to a method of making one or more of the embodiments described herein, and as one non-limiting example, compounds having the formula $A_x(M)(YO_4)_a(XO_3)_b$, where A comprises one or more alkali metals, M comprises one or more non-alkali metal cations, X is selected from the group consisting of B, C, or N, and Y is selected from the group consisting of Si, P, As, S, V, Nb, Mo, or W. In some cases, x is greater than about 0.1, a is between about 0.1 and about 5.1, and b is between about 0.1 and about 5.1.

Described herein, in accordance with certain aspects, is subject matter specified by the following clauses. These clauses are intended to exemplary and non-limiting.

1. A compound, having a formula $Li_x(M)(PO_4)_a(CO_3)_b$, wherein M comprises one or more non-alkali metal cations, wherein at least about 25 mol % of M comprises one or more non-alkali/non-alkaline earth metals, x is greater than about 0.1, a is between about 0.1 and about 5.1, and b is between about 0.1 and about 5.1.

2. The compound of clause 1, wherein M comprises one or more bivalent or trivalent cations.

3. The compound of any one of clauses 1 or 2, wherein M comprises one or more transition metals.

4. The compound of any one of clauses 1-3, wherein M comprises one or more of Fe, Mn, Co, Ni, V, Cr, Cu, Ti, Bi, Sn, Sb, or Mo.

5. The compound of any one of clauses 1-4, wherein M consists essentially of Fe and/or Mn.

6. The compound of any one of clauses 1-5, wherein M comprises Fe.

7. The compound of any one of clauses 1-4 and 6, wherein M comprises Ni.

8. The compound of any one of clauses 1-4, 6, or 7, wherein M comprises Co.

9. The compound of any one of clauses 1-5, wherein M comprises Mn.

10. The compound of any one of clauses 1-4 or 6-8, wherein M comprises V.

11. The compound of any one of clauses 1-4, 6-8, or 10, wherein M comprises Mo.

12. The compound of any one of clauses 1-4, 6-8, 10, or 11, wherein M comprises an alkaline earth metal.

13. The compound of any one of clauses 1-4, 6-8, or 10-12, wherein at least about 50 mol % of M comprises one or more non-alkali/non-alkaline earth metals.

14. The compound of any one of clauses 1-13, wherein each cation in M has an oxidation state of between 1+ and 5+, inclusively.

15. The compound of any one of clauses 1-14, wherein each cation in M has an oxidation state of between 1+ and 4+, inclusively.

16. The compound of any one of clauses 1-15, wherein each cation in M has an oxidation state of between 2+ and 4+, inclusively.

17. The compound of any one of clauses 1-16, wherein x is between about 1.5 and about 10.1.

18. The compound of any one of clauses 1-17, wherein x is between about 1.9 and about 3.1.

19. The compound of any one of clauses 1-18, wherein x is 3.

20. The compound of any one of clauses 1-18, wherein x is 2.

21. The compound of any one of clauses 1-20, wherein a is between about 0.1 and about 4.

22. The compound of any one of clauses 1-21, wherein a is between about 0.9 and about 1.1.

23. The compound of any one of clauses 1-22, wherein a is 1.

24. The compound of any one of clauses 1-23, wherein b is between about 0.1 and about 4.

25. The compound of any one of clauses 1-24, wherein b is between about 0.9 and about 1.1.

26. The compound of any one of clauses 1-25, wherein b is 1.

27. The compound of any one of clauses 1-26, wherein the compound has a unit cell atomic arrangement that is isostructural to a sidorenkite unit cell, a bonshtedtite unit cell, a bradleyite unit cell, a crawfordite unit cell, or a ferrotychite unit cell.

28. The compound of any one of clauses 1-27, wherein the compound has a triclinic crystal structure.

29. An electrochemical device, comprising an electrode comprising a compound as in any one of clauses 1-28.

30. A compound, having a formula $A_x(M)(PO_4)_a(CO_3)_b$, wherein A comprises one or more alkali metals, M comprises one or more non-alkali metal cations, wherein at least about 25 mol % of M comprises one or more non-alkali/non-alkaline earth metals, x is greater than about 0.1, a is between about 0.1 and about 5.1, and b is between about 0.1 and about 5.1; optionally with the proviso that the compound is not one wherein when A is Na, x is between 2 and 4, and M is Fe, Mg, Mn, or Sr.

31. The compound of clause 30, wherein A consists essentially of one alkali metal.

32. The compound of any one of clauses 30 or 31, wherein A comprises Li.

33. The compound of any one of clauses 30-32, wherein A comprises Na.

34. The compound of any one of clauses 30-32, wherein A consists essentially of Li.

35. The compound of any one of clauses 30, 31, or 33, wherein A consists essentially of Na.

36. The compound of any one of clauses 30, 32, or 34, wherein A consists essentially of Li and Na.

37. The compound of any one of clauses 30-36, wherein M comprises one or more bivalent or trivalent cations.

38. The compound of any one of clauses 30-37, wherein x is between about 1.5 and about 10.1.

39. The compound of any one of clauses 30-38, wherein x is between about 1.9 and about 3.1.

40. The compound of any one of clauses 30-39, wherein a is between about 0.1 and about 4.

41. The compound of any one of clauses 30-40, wherein a is between about 0.9 and about 1.1.

42. The compound of any one of clauses 30-41, wherein b is between about 0.1 and about 4.

43. The compound of any one of clauses 30-42, wherein b is between about 0.9 and about 1.1.

44. The compound of any one of clauses 30-43, wherein at least about 50 mol % of M comprises one or more non-alkali/non-alkaline earth metals.

45. The compound of any one of clauses 30-44, wherein M comprises an alkaline earth metal.

46. The compound of any one of clauses 30-45, wherein M comprises a transition metal.

47. The compound of any one of clauses 30-46, wherein M comprises one or more of Fe, Mn, Co, Ni, V, Cr, Cu, Ti, Bi, Sn, Sb, or Mo.

48. The compound of any one of clauses 30-47, wherein the compound has a unit cell atomic arrangement that is isostructural to a sidorenkite unit cell, a bonshtedtite unit cell, or a bradleyite unit cell, a crawfordite unit cell, or a ferrotychite unit cell.

49. The compound of any one of clauses 30-48, wherein the compound has a triclinic crystal structure.

50. An electrochemical device, comprising an electrode comprising a compound as in any one of clauses 30-49.

51. A lithium-containing compound having a unit cell atomic arrangement that is isostructural to a sidorenkite unit cell, a bonshtedtite unit cell, a bradleyite unit cell, a crawfordite unit cell, or a ferrotychite unit cell.

52. A lithium-containing compound comprising at least about 25 mol % lithium, the compound having a unit cell containing CO₃ triangular planar groups, PO₄ tetrahedral groups, and MO₆ octahedral groups, wherein M is a positive cation.

53. The compound of clause 52, wherein M is a positive bivalent or trivalent cation.

54. The compound of any one of clauses 52 or 53, wherein the MO₆ octahedral group shares an edge with the CO₃ triangular planar group.

55. The compound of any one of clauses 52-54, wherein the MO₆ octahedral group shares 4 vertices with PO₄ tetrahedral groups.

56. The compound of any one of clauses 52-55, wherein M comprises Fe.

57. The compound of any one of clauses 52-56, wherein M comprises Ni.

58. The compound of any one of clauses 52-57, wherein M comprises Co.

59. The compound of any one of clauses 52-58, wherein M comprises Mn.

60. The compound of any one of clauses 52-59, wherein M comprises V.

61. The compound of any one of clauses 52-60, wherein M comprises Cr.

62. The compound of any one of clauses 52-61, wherein M comprises Cu.

63. The compound of any one of clauses 52-62, wherein M comprises Ti.

64. The compound of any one of clauses 52-63, wherein M comprises Bi.

65. The compound of any one of clauses 52-64, wherein M comprises Sn.

66. The compound of any one of clauses 52-65, wherein M comprises Sb.

67. The compound of any one of clauses 52-66, wherein M comprises Mo.

68. An electrochemical device, comprising an electrode comprising a compound as in any one of clauses 52-67.

69. A lithium-containing compound having an XRD diffraction pattern having maxima at 2 thetas of 10.7±1, 20.4±1, 21.4±1, 27.1±1, 28.8±1, 34.0±1, and 35.8±1 degrees, wherein the XRD is acquired using an X-ray diffractometer having a copper K alpha source with a wavelength of 1.5418 angstrom.

70. A compound having a formula $A_x(M)(YO_4)_a(XO_3)_b$, wherein A comprises one or more alkali metals; M comprises one or more non-alkali metal cations, wherein at least about 25 mol % of M comprises one or more non-alkali/non-alkaline earth metals; X comprises one or more of B, C, or N; Y comprises one or more of Si, P, As, or S; x is greater than about 0.1; a is between about 0.1 and about 5.1; and b is between about 0.1 and about 5.1; optionally with the proviso that the composition does not include any of the following combinations for A, M, Y, and X, respectively: Na, Al and Co, Si, N; Na, Fe, Si, B; Na, Al and Co, Si, C; Na, Mn, P, C; Na, Fe, P, C; Na, Co, P, B; Na, Mg and Fe, S, C; Na, Fe, S, C; Li, Cu, P, B; and Li, Zn, P, B.

71. A compound having a formula $A_x(M)(YO_4)_a(XO_3)_b$, wherein A comprises one or more alkali metals; M comprises one or more non-alkali metal cations, wherein at least about 25 mol % of M comprises one or more non-alkali/non-alkaline earth metals, and wherein M does not comprise V, Nb, Mo, or W; X comprises one or more of B, C, or N; Y comprises one or more of V, Nb, Mo, and W; x is greater than about 0.1; a is between about 0.1 and about 5.1; and b is between about 0.1 and about 5.1; optionally with the proviso that the composition does not include any of the following combinations for A, M, Y, and X, respectively: Na, Al and Co, Si, N; Na, Fe, Si, B; Na, Al and Co, Si, C; Na, Mn, P, C; Na, Fe, P, C; Na, Co, P, B; Na, Mg and Fe, S, C; Na, Fe, S, C; Li, Cu, P, B; and Li, Zn, P, B.

72. The compound of any one of clauses 70 or 71, wherein M comprises one or more bivalent or trivalent cations.

73. The compound of any one of clauses 70-72, wherein M comprises one or more alkaline earth metals.

74. The compound of any one of clauses 70-73, wherein M comprises one or more transition metals.

75. The compound of any one of clauses 70-74, wherein M comprises one or more of Fe, Mn, Co, Ni, V, Cr, Cu, Ti, Bi, Sn, Sb, or Mo.

76. The compound of any one of clauses 70-75, wherein x is between about 1.5 and about 10.1.

77. The compound of any one of clauses 70-76, wherein x is between about 1.9 and about 10.1.

78. The compound of any one of clauses 70-77, wherein x is between about 1.9 and about 3.1.

79. The compound of any one of clauses 70-78, wherein a is between about 0.1 and about 4.

80. The compound of any one of clauses 70-79, wherein a is between about 0.9 and about 1.1.

81. The compound of any one of clauses 70-80, wherein b is between about 0.1 and about 4.

82. The compound of any one of clauses 70-81, wherein b is between about 0.9 and about 1.1.

83. The compound of any one of clauses 70-82, wherein b is between about 2.9 and about 3.1.

84. The compound of any one of clauses 70-83, wherein a is 1 and b is 3.

85. The compound of any one of clauses 70 or 72-84, wherein X and Y are selected from one of the following combinations for X and Y: C, P; B, P; B, Si; C, Si; C, S; B, S; N, P; N, Si; and N, S.

86. The compound of any one of clauses 71-85, wherein X and Y are selected from one of the following combinations for X and Y: C, V; B, V; and N, V.

87. The compound of any one of clauses 70 or 72-86, wherein X is C and Y is P.

88. The compound of any one of clauses 70-87, wherein the compound has a unit cell atomic arrangement that is isostructural to a sidorenkite unit cell, a bonshtedtite unit cell, or a bradleyite unit cell, a crawfordite unit cell, or a ferrotychite unit cell.

89. The compound of any one of clauses 70-88, wherein the compound has a triclinic crystal structure.

90. An electrochemical device, comprising an electrode comprising a compound as in any one of clauses 70-89.

91. An electrochemical device, comprising an electrode comprising a compound having a formula $A_x(M)(PO_4)_a(CO_3)_b$, wherein A comprises one or more alkali metals, M comprises one or more metal cations having more than one oxidation state above the ground state, wherein at least about 25 mol % of M comprises one or more non-alkali/non-alkaline earth metals, x is greater than about 0.1, a is between about 0.1 and about 5.1, and b is between about 0.1 and about 5.1.

92. The device of clause 91, wherein M comprises one or more non-alkali metal cations.

93. The device of any one of clauses 91 or 92, wherein M comprises one or more bivalent or trivalent cations.

94. The device of any one of clauses 91-93, wherein M comprises one or more alkaline earth metals.

95. The device of any one of clauses 91-94, wherein M comprises one or more transition metals.

96. The device of any one of clauses 91-95, wherein M comprises one or more of Fe, Mn, Co, Ni, V, Cr, Cu, Ti, Bi, Sn, Sb, or Mo.

97. The device of any one of clauses 91-96, wherein x is between about 1.5 and about 10.1.

98. The device of any one of clauses 91-97, wherein x is between about 1.9 and about 3.1.

99. The device of any one of clauses 91-98, wherein a is between about 0.1 and about 4.

100. The device of any one of clauses 91-99, wherein a is between about 0.9 and about 1.1.

101. The device of any one of clauses 91-100, wherein b is between about 0.1 and about 4.

102. The device of any one of clauses 91-101, wherein b is between about 0.9 and about 1.1.

103. The device of any one of clauses 91-102, wherein the compound has a unit cell atomic arrangement that is isostructural to a sidorenkite unit cell, a bonshtedtite unit cell, or a bradleyite unit cell, a crawfordite unit cell, or a ferrotychite unit cell.

104. An electrochemical device, comprising an electrode comprising a compound having a formula $A_x(M)(YO_4)_a(XO_3)_b$, wherein A comprises one or more alkali metals; M comprises one or more non-alkali metal cations, wherein at least about 25 mol % of M comprises one or more non-alkali/non-alkaline earth metals; X is selected from the group consisting of B, C, or N; Y is selected from the group consisting of Si, P, As, S, V, Nb, Mo, or W; x is greater than about 0.1; a is between about 0.1 and about 5.1; and b is between about 0.1 and about 5.1.

105. The device of clause 104, wherein M comprises one or more bivalent or trivalent cations.

106. The device of any one of clauses 104 or 105, wherein M comprises one or more alkaline earth metals.

107. The device of any one of clauses 104-106, wherein M comprises one or more transition metals.

108. The device of any one of clauses 104-107, wherein M comprises one or more of Fe, Mn, Co, Ni, V, Cr, Cu, Ti, Bi, Sn, Sb, or Mo.

109. The device of any one of clauses 104-108, wherein x is between about 1.5 and about 10.1.

110. The device of any one of clauses 104-109, wherein x is between about 1.9 and about 3.1.

111. The device of any one of clauses 104-110, wherein a is between about 0.1 and about 4.

112. The device of any one of clauses 104-111, wherein a is between about 0.9 and about 1.1.

113. The device of any one of clauses 104-112, wherein b is between about 0.1 and about 4.

114. The device of any one of clauses 104-113, wherein b is between about 0.9 and about 1.1.

115. The device of any one of clauses 104-114, wherein the compound has a unit cell atomic arrangement that is isostructural to a sidorenkite unit cell, a bonshtedtite unit cell, or a bradleyite unit cell, a crawfordite unit cell, or a ferrotychite unit cell.

116. A method, comprising providing an aqueous liquid comprising a phosphate anion, a carbonate anion, an alkali metal cation, and a non-alkali metal cation; exposing the liquid to a controlled temperature of at least about 70° C.; and removing water from the liquid to recover a solid product.

117. The method of clause 116, wherein the product is crystalline.

118. The method of any one of clauses 116 or 117, further comprising forming the solid product into an electrode.

119. The method of any one of clauses 116-118, comprising adding a first compound comprising an alkali metal cation and a phosphate anion, and a second compound comprising a non-alkali metal cation and a carbonate anion, to water to form the aqueous liquid.

120. The method of any one of clauses 116-118, comprising adding a first compound comprising an alkali metal cation and a carbonate anion, and a second compound comprising a non-alkali metal cation and a phosphate anion, to water to form the aqueous liquid.

121. The method of any one of clauses 116-118, comprising adding a first compound comprising an alkali metal cation and a carbonate anion, a second compound comprising a non-alkali metal cation and a nitrate anion, and a third compound comprising a phosphate anion, to water to form the aqueous liquid.

122. The method of any one of clauses 116-118, comprising adding a first compound comprising an alkali metal cation and a carbonate anion; a second compound comprising a chlorine anion, a sulfate anion, a bromine anion, and an iodine anion; and a third compound comprising a phosphate anion, to water to form the aqueous liquid.

123. The method of any one of clauses 116-118, comprising adding a first compound comprising an alkali metal cation, a second compound comprising a non-alkali metal cation, a third compound comprising a carbonate anion, and a fourth compound comprising a phosphate anion, to water to form the aqueous liquid.

124. The method of any one of clauses 116-123, wherein the ratio of alkali metal cation to phosphate anion in the aqueous liquid is between about 5:0.1 and about 1:50.

125. The method of any one of clauses 116-124, wherein the ratio of alkali metal cation to phosphate anion in the aqueous liquid is between about 5:0.1 and about 1:10.

126. The method of any one of clauses 116-125, wherein the ratio of alkali metal cation to phosphate anion in the aqueous liquid is between about 5:0.1 and about 1:5.

127. The method of any one of clauses 116-126, wherein the ratio of alkali metal cation to phosphate anion in the aqueous liquid is about 1:1.

128. The method of any one of clauses 116-127, wherein the ratio of alkali metal cation to carbonate anion in the aqueous liquid is between about 5:0.1 and about 1:50.

129. The method of any one of clauses 116-128, wherein the ratio of alkali metal cation to carbonate anion in the aqueous liquid is between about 5:0.1 and about 1:10.

130. The method of any one of clauses 116-129, wherein the ratio of alkali metal cation to carbonate anion in the aqueous liquid is between about 5:0.1 and about 1:5.

131. The method of any one of clauses 116-130, wherein the ratio of alkali metal cation to carbonate anion in the aqueous liquid is about 1:1.

132. The method of any one of clauses 116-131, wherein the ratio of phosphate anion to carbonate anion in the aqueous liquid is between about 1:0.1 and about 1:10.

133. The method of any one of clauses 116-132, wherein the ratio of phosphate anion to carbonate anion in the aqueous liquid is between about 1:0.5 and about 1:2.

134. The method of any one of clauses 116-133, wherein the ratio of phosphate anion to carbonate anion in the aqueous liquid is about 1:1.

135. The method of any one of clauses 116-134, wherein the ratio of alkali metal cation to non-alkali metal cation is between about 1:0.1 and about 1:10.

136. The method of any one of clauses 116-135, wherein the ratio of alkali metal cation to non-alkali metal cation is between about 1:0.2 and about 1:5.

137. The method of any one of clauses 116-136, wherein the ratio of alkali metal cation to non-alkali metal cation is between about 1:0.5 and about 1:2.

138. A compound having a triclinic (P1) crystal structure and a formula $A_x(M)(PO_4)_a(CO_3)_b$, wherein A comprises one or more alkali metals, M comprises one or more non-alkali metal cations, wherein at least about 25 mol % of M comprises one or more non-alkali/non-alkaline earth metals, x is greater than about 0.1, a is between about 0.1 and about 5.1, and b is between about 0.1 and about 5.1.

139. A compound having a triclinic (P1) crystal structure and a formula $A_x(M)(YO_4)_a(XO_3)_b$, wherein A comprises one or more alkali metals; M comprises one or more non-alkali metal cations, wherein at least about 25 mol % of M comprises one or more non-alkali/non-alkaline earth metals; X comprises one or more of B, C, or N; Y comprises one or more of Si, P, As, or S; x is greater than about 0.1; a is between about 0.1 and about 5.1; and b is between about 0.1 and about 5.1.

140. A compound having a triclinic (P1) crystal structure and a formula $A_x(M)(YO_4)_a(XO_3)_b$, wherein A comprises one or more alkali metals; M comprises one or more non-alkali metal cations, wherein at least about 25 mol % of M comprises one or more non-alkali/non-alkaline earth metals, and wherein M does not comprise V, Nb, Mo, or W; X comprises one or more of B, C, or N; Y comprises one or more of V, Nb, Mo, and W; x is greater than about 0.1; a is between about 0.1 and about 5.1; and b is between about 0.1 and about 5.1.

141. An electrochemical device, comprising an electrode comprising a compound as in any one of clauses 138-140.

142. An electrochemical device, comprising an electrode comprising a lithium-containing compound, the compound having a formula $Li_x(M)(PO_4)_a(CO_3)_b$, wherein M comprises one or more non-alkali metal cations, wherein at least about 25 mol % of M comprises one or more non-alkali/non-alkaline earth metals, wherein the lithium-containing compound has a unit cell containing $CO_3$ triangular planar groups, $PO_4$ tetrahedral groups, and $MO_6$ octahedral groups, x is greater than about 0.1, a is between about 0.1 and about 5.1, and b is between about 0.1 and about 5.1.

In still another aspect, the present invention is directed to a method of using one or more of the embodiments described herein, for example, compounds such as the one described above, or other compounds as discussed below.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
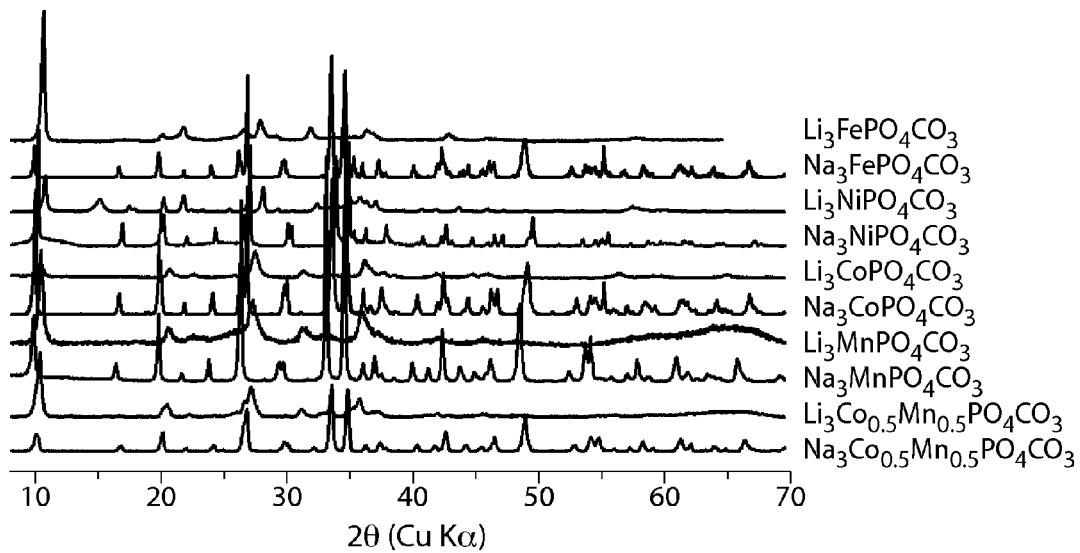
FIG. 1 illustrates XRD patterns for certain compounds of the invention.

The present invention generally relates to carbophosphates and other compounds. Such compounds may be used in batteries and other electrochemical devices, or in other applications such as those described herein. One aspect of the invention is generally directed to carbophosphate compounds, i.e., compounds containing carbonate and phosphate ions. For example, according to one set of embodiments, the compound has a formula $A_x(M)(PO_4)_a(CO_3)_b$, where M comprises one or more cations. A may include one or more alkali metals, for example, lithium and/or sodium. In some cases, x is greater than about 0.1, a is between about 0.1 and about 5.1, and b is between about 0.1 and about 5.1. In certain embodiments, the compound may have a unit cell atomic arrangement that is isostructural to the unit cells of the minerals sidorenkite, bonshtedtite, bradleyite, crawfordite, or ferrotychite. In some embodiments, the compound may have a formula $A_x(M)(YO_4)_a(XO_3)_b$, where A comprises one or more alkali metals, M comprises one or more cations, X includes B, C, and/or N, and Y includes Si, P, As, S, V, Nb, Mo, and/or W. In some cases, x is greater than about 0.1, a is between about 0.1 and about 5.1, and b is between about 0.1 and about 5.1. Other aspects of the invention are generally directed to techniques for making or using such compounds, kits involving such compounds, and the like.

Certain aspects of the present invention are generally directed to compounds containing alkali metals such as lithium, sodium, or potassium, one or more other cations, and polyanionic groups such as carbonate and/or phosphate groups. In some cases, however, other groups besides or in addition to carbonate and/or phosphate groups may be present. Examples of suitable polyanionic groups are discussed below. The alkali metals are those associated with Group 1 of the Periodic Table, and include lithium (Li), sodium (Na), potassium (K), rubidium (Rb), cesium (Cs), or francium (Fr), and one or more than one may be present. Thus, for example, a "lithium-containing compound" contains lithium in addition to other ions, while a "sodium-containing compound" contains sodium in addition to other ions. While hydrogen (H) is not a metal, it is part of Group 1 and can in many cases be interchanged for alkali metals; thus, as used herein, an "alkali metal" includes hydrogen. In various formulae as described herein, one or more alkali metals may be present, including any of those described above. In some cases, the structural formulae described herein includes "A," which represents, in any such formula disclosed herein, one or more alkali metals.

It should be noted that the atoms forming the compounds are held together by chemical bonds, but the chemical bonds need not be covalent bonds (although some of the bonds may include covalent bonds), e.g., the compound may include ionic compounds, where at least some of the atoms are bonded to form compounds due to ionic or electrostatic bonds. Other bonding interactions are also possible, e.g., metallic bonds, van der Waals forces, or the like.

Phosphate anions (also referred to as phosphate) typically have the formula $PO_4^{3-}$, and carbonate anions (also referred to as carbonate) typically have the formula $CO_3^{2-}$. Both phosphate and carbonate are examples of polyatomic anions, or "polyanions," where a chemical anionic group composed of two or more atoms covalently bonded or complexed together can be considered as acting as a single unit (in contrast, an oxide ion, $O^{2-}$, consists of a single atom and is thus not a polyanion). In some cases, other polyanions may be used in addition to or instead of phosphates and/or carbonates, as is further discussed below. Some non-limiting examples of polyanions include borate, nitrate, silicate, arsenate, sulfate, vanadate, niobate, molybdate, or tungstate.

Through electronic structure modifications, certain polyanionic groups such as phosphate groups ($PO_4$) have been shown the raise the operating voltage of a given transition metal ion. They may, in some cases, increase stability by binding oxygen more strongly in the compound. Certain polyanionic groups such as carbonate groups are relatively light compared to other polyanionic groups, e.g., phosphate groups. The use of such relatively light polyanionic groups, such as carbonate groups, with or without the presence of other polyanionic groups such as phosphate groups, can thus lead to relatively higher energy densities. To the inventors' knowledge, no lithium-containing compounds with combined carbonate and phosphate groups are known to be or have been tested as battery materials.

The compound may also include one or more cations. For example, in some cases, the compound may include monovalent cations (with a formal charge of 1+), bivalent cations (with a formal charge of 2+), and/or trivalent cations (with a formal charge of 3+). Examples of monovalent cations include alkali metals such as those previously described, as well as certain transition metal ions. Examples of bivalent or trivalent cations include, but are not limited to, various transition metal ions or alkaline earth metal ions. The alkaline earth metals are those associated with Group 2 of the Periodic Table and typically include beryllium (Be), magnesium (Mg), calcium (Ca), strontium (Sr), barium (Ba) and/or radium (Ra). One or more than one may be present, depending on the embodiment. The transition metals include Groups 3-12 of the Periodic Table, and include elements such as scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), tungsten (W), etc. Other examples of cations include non-transition metal cations such as bismuth (Bi), tin (Sn), antimony (Sb), etc.

As discussed herein, certain compounds of the invention are represented by structural formulae, which may include "M," which represents, in any such formula disclosed herein, one or more cations. For instance, M may comprise one or more bivalent and/or trivalent cations, according to certain embodiments. In some embodiments, M does not include alkali metals such as lithium or sodium, and/or monovalent cations. M also does not include alkaline earth metals such as magnesium or calcium, in certain embodiments of the invention. In some cases, at least about 10 mol % of the M cations may include one or more than one non-alkali, non-alkaline earth metal. In certain embodiments, at least about 25 mol %, at least about 50 mol %, at least about 75 mol %, or essentially all of the M cations may include one or more non-alkali, non-alkaline earth metal ions.

The compound, in some embodiments, may be solid, and in some cases, crystalline; for example, the cations and anions disclosed herein forming the compound may be arranged in a repeating array having a definite crystal structure, i.e., defining a unit cell atomic arrangement that is repeated to form the crystalline structure. For instance, the cations and anions may be arranged in certain compounds of the present invention such that the unit cell atomic arrangement is isostructural to a sidorenkite unit cell, a bonshtedtite unit cell, a bradleyite unit cell, a crawfordite unit cell, or a ferrotychite unit cell, as discussed in more detail below.

In one aspect, the present invention is directed to a compound containing an alkali metal cation, a non-alkali metal cation or a metal cation having more than one oxidation state above the ground state (i.e., where the ground state is $M^0$), a phosphate anion, and a carbonate anion. The compound may be stoichiometric or off-stoichiometric. For example, the compound, in one set of embodiments, may have the formula:

$$A_xM_y(PO_4)_a(CO_3)_b.$$

In this formula, A is an alkali metal (e.g., Li, Na, K, etc.), and M comprises one or more cations. For example, M may comprise one or more non-alkali metal cations, one or more metal cations having more than one oxidation state above the ground state (i.e., $M^0$), one or more non-alkaline earth metal cations, one or more bivalent or trivalent cations, one or more transition metal ions, or the like, as well as combinations of these (e.g., M may comprise one or more cations that are not alkali metals and are not alkaline earth metals). Combinations of M are also possible, for example, M may include one or more bivalent cations and/or one or more trivalent cations, etc. In some cases, only some of the cations forming M may include transition metal ions. For example, as noted above, in some embodiments, at least about 10 mol %, at least about 25 mol % at least about 50 mol %, or at least about 75 mol % of the cations forming M may be transition metal ions. In certain embodiments, at least about 10 mol %, at least about 25 mol % at least about 50 mol %, or at least about 75 mol % of M comprises one or more non-alkali and non-alkaline earth metals. As specific non-limiting examples, in one set of embodiments, the formula may be $Li_x(M)(PO_4)_a(CO_3)_b$ or $Na_x(M)(PO_4)_a(CO_3)_b$.

In any of the formulae herein, a may be between about 0.1 and about 5.1, between about 0.1 and about 4.1, between about 0.2 and about 4.1, between about 0.3 and about 3.1, between about 0.4 and 2.1, between about 0.5 and about 1.5, between about 0.7 and about 1.3, or between about 0.9 and about 1.1. b may also be between about 0.1 and about 5.1, between about 0.1 and about 4.1, between about 0.2 and about 4.1, between about 0.3 and about 3.1, between about 2.9 and about 3.1, between about 0.4 and 2.1, between about 0.5 and about 1.5, between about 0.7 and about 1.3, or between about 0.9 and about 1.1. In some embodiments, a is about 1, and/or b is about 1. In addition, y may be greater than about 0.1. For example, y may be between about 0.1 and about 5.1, between about 0.1 and about 4.1, between about 0.2 and about 4.1, between about 0.3 and about 3.1, between about 0.4 and 2.1, between about 0.5 and about 1.5, between about 0.7 and about 1.3, or between about 0.9 and about 1.1. y may also be 1 in some instances. x may also be greater than about 0.1. For example, x may be between about 0.1 and about 5.1, between about 0.1 and about 4.1, between about 1.5 and about 10.1, between about 1.9 and about 10.1, between about 0.2 and about 4.1, between about 1.5 and about 3.5, between about 1.7 and about 3.3, between about 1.9 and about 3.1, between about 1.8 and about 2.2, between about 1.9 and about 2.1, between about 2.8 and about 3.2 or between about 2.9 and about 3.1. For example, x may be 2 or 3 in some cases; other ranges for x are discussed below.

In one set of embodiments, x, y, a, and b are selected such that the quantity $(x+jy-3a-2b)$, where j is the total valency of M (mole-averaged if more than one M is present), is between about $-0.5$ and about $0.5$, between about $-0.3$ and about $0.3$, or between $-0.1$ and about $0.1$. In some (but not all) cases, the quantity $(x+jy-3a-2b)$ is about 0. As one non-limiting example, this relationship may be satisfied if a and b are each 1, x is 3, y is 1, and M is bivalent (so that j is 2). However, in other embodiments, these relations may not necessarily be required, for example, for certain off-stoichiometric compounds of the invention.

As discussed, M in any of the formulae herein may be a cation, such as a non-alkali metal cation. In some cases, some or all of the cations in M may have any oxidation state, for example, between 1+ and 5+ inclusively, between 1+ and 4+ inclusively, between 1+ and 3+ inclusively, between 1+ and 2+ inclusively, between 2+ and 5+ inclusively, between 2+ and 4+ inclusively, between 2+ and 3+ inclusively, between 3+ and 5+ inclusively, between 4+ and 5+ inclusively, or the like. In some cases, any M that is/are present may have a single oxidation state, e.g., 1+, 2+2 3+, 4+, 5+, 6+, etc. In some embodiments, M may comprise one or more metal cations having more than one oxidation state above the ground state (i.e., $M^0$). In some cases, M may include one or more monovalent, bivalent, or trivalent cations. For example, M may be a transition metal (e.g., Fe, Ni, Co, Mn, V, Mo, W, etc.), an alkaline metal (e.g., Mg or Sr), or the like, and/or M may comprise or consist essentially of two, three, four, or more such cations. In certain embodiments, at least about 10 mol %, at least about 25 mol % at least about 50 mol %, or at least about 75 mol % of the cations forming M may be transition metal ions. In some embodiments, at least about 10 mol %, at least about 25 mol % at least about 50 mol %, or at least about 75 mol % of M comprises one or more non-alkali and non-alkaline earth metals.

In some embodiments, M may include two or more bivalent cations, trivalent cations, or any combination of these. For example, in some embodiments, the compound may have the formula:

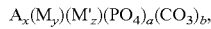

where M and M' are each independently bivalent or trivalent cations, M is not identical to M', and y and z may be chosen, at least in some cases, such that the quantity $(y+z)$ is between about 0.9 and about 1.1, or the quantity $(y+z)$ may be about 1. For example, y and z may each be about ½, y may be about ⅓ and z may about ⅔, y may be about ¼ and z may be about ¾, etc. In some (but not all) cases, x, y, z, a and b may be chosen such that the quantity $(x+jy+kz-3a-2b)$, where j is the valency of M and k is the valency of M', is between about $-0.5$ and about $0.5$, between about $-0.3$ and about $0.3$, or between $-0.1$ and about $0.1$. In some cases, the quantity $(x+jy+kz-3a-2b)$ is about 0. As a specific non-limiting example, this relationship is satisfied if a and b are each 1, x is 3, y is ½, and z is ½ when M and M' are each bivalent (i.e., when j is 2 and k is 2). In still other embodiments, there may be 3, 4, or more bivalent and/or trivalent cations present within the compound.

Typically, compounds such as the ones described above (or any other compound and/or formulae discussed herein) will have subscripts selected such that the compound is essentially electrically neutral (uncharged) in the absence of an applied electric field. For example, the subscripts within the compound may be selected to be whole numbers, decimals, or fractions, so long as the positive and negative charges essentially balance, giving the compound an essentially neutral charge when no electric field is applied. Determining whether a compound is electrically neutral can be performed by those of ordinary skill in the art, as the formal charges for each atom or polyanion are well-known (e.g., Li is 1+, K is 1+, $PO_4$ is 3−, $CO_3$ is 2−, etc.). However, in some cases, the compounds may have subscripts that do not necessarily require the compound to be essentially electrically neutral in the absence of an applied electric field, for example, for certain off-stoichiometric compounds as discussed herein.

In one set of embodiments, a compound of the present invention may have the formula:

where x is between about 2.9 and about 3.1, and A, M, a, and b, are the same as those discussed above. As non-limiting examples, x may be 3 in some cases; M may be a single bivalent cation; a may be between about 0.1 and about 5.1; and/or b may be between about 0.1 and about 5.1. For instance, the compound may have the formula $A_3(M)(PO_4)(CO_3)$, for example, $Li_3(M)(PO_4)(CO_3)$, $Na_3(M)(PO_4)(CO_3)$, or $K_3(M)(PO_4)(CO_3)$. Examples of bivalent cations include, but are not limited to, Fe, Ni, Co, Mn, V, Mo, Sr, Cr, Cu, Ti, Bi, Sn, Sb, or Mg. Thus, specific examples of compounds include, but are not limited to, $Li_3FeCO_3PO_4$, $Li_3NiCO_3PO_4$, $Li_3CoCO_3PO_4$, $Li_3MnCO_3PO_4$, $Li_3VCO_3PO_4$, $Li_3MoCO_3PO_4$, $Na_3FeCO_3PO_4$, $Na_3NiCO_3PO_4$, $Na_3CoCO_3PO_4$, $Na_3MnCO_3PO_4$, $Na_3VCO_3PO_4$, $Na_3MoCO_3PO_4$, $K_3FeCO_3PO_4$, $K_3NiCO_3PO_4$, $K_3CoCO_3PO_4$, $K_3MnCO_3PO_4$, $K_3VCO_3PO_4$, or $K_3MoCO_3PO_4$. Additional non-limiting examples include $Li_3CrCO_3PO_4$, $Na_3CrCO_3PO_4$, $K_3CrCO_3PO_4$, $Li_3CuCO_3PO_4$, $Na_3CuCO_3PO_4$, $K_3CuCO_3PO_4$, $Li_3TiCO_3PO_4$, $Na_3TiCO_3PO_4$, $K_3TiCO_3PO_4$, $Li_3BiCO_3PO_4$, $Na_3BiCO_3PO_4$, $K_3BiCO_3PO_4$, $Li_3SnCO_3PO_4$, $Na_3SnCO_3PO_4$, $K_3SnCO_3PO_4$, $Li_3SbCO_3PO_4$, $Na_3SbCO_3PO_4$, or $K_3SbCO_3PO_4$.

In some embodiments, however, more than one bivalent cation may be present, for example, as in the formula:

where x is between about 2.9 and about 3.1, M and M' are each independently single bivalent cations, and the quantity $(y+z)$ is between about 0.9 and about 1.1, at least in some cases. These variables (e.g., A, M, a, b, y, and z) may otherwise be the same as those discussed above. For example, a may be between about 0.1 and about 5.1, and/or b may be between about 0.1 and about 5.1. For instance, the compound may have the formula $A_3(M_{1/2}M'_{1/2})(PO_4)(CO_3)$, for example, $Li_3(M_{1/2}M'_{1/2})(PO_4)(CO_3)$, $Na_3(M_{1/2}M'_{1/2})(PO_4)(CO_3)$, or $K_3(M_{1/2}M'_{1/2})(PO_4)(CO_3)$. Specific non-limiting examples include $Li_3Fe_{1/2}Ni_{1/2}CO_3PO_4$, $Li_3Fe_{1/2}Co_{1/2}CO_3PO_4$, $Li_3Fe_{1/2}Mn_{1/2}CO_3PO_4$, $Li_3Fe_{1/2}V_{1/2}CO_3PO_4$, $Li_3Fe_{1/2}Mo_{1/2}CO_3PO_4$, $Li_3Ni_{1/2}Co_{1/2}CO_3PO_4$, $Li_3Ni_{1/2}Mn_{1/2}CO_3PO_4$, $Li_3Ni_{1/2}V_{1/2}CO_3PO_4$, $Li_3Ni_{1/2}Mo_{1/2}CO_3PO_4$, $Li_3Co_{1/2}Mn_{1/2}CO_3PO_4$, $Li_3Co_{1/2}V_{1/2}CO_3PO_4$, $Li_3Co_{1/2}Mo_{1/2}CO_3PO_4$, $Li_3Mn_{1/2}V_{1/2}CO_3PO_4$, $Li_3Mn_{1/2}Mo_{1/2}CO_3PO_4$, $Li_3V_{1/2}Mo_{1/2}CO_3PO_4$, $Na_3Fe_{1/2}Ni_{1/2}CO_3PO_4$, $Na_3Fe_{1/2}Co_{1/2}CO_3PO_4$, $Na_3Fe_{1/2}Mn_{1/2}CO_3PO_4$, $Na_3Fe_{1/2}V_{1/2}CO_3PO_4$, $Na_3Fe_{1/2}Mo_{1/2}CO_3PO_4$, $Na_3Ni_{1/2}Co_{1/2}CO_3PO_4$, $Na_3Ni_{1/2}Mn_{1/2}CO_3PO_4$, $Na_3Ni_{1/2}V_{1/2}CO_3PO_4$, $Na_3Ni_{1/2}Mo_{1/2}CO_3PO_4$, $Na_3Co_{1/2}Mn_{1/2}CO_3PO_4$, $Na_3Co_{1/2}V_{1/2}CO_3PO_4$, $Na_3Co_{1/2}Mo_{1/2}CO_3PO_4$, $Na_3Mn_{1/2}V_{1/2}CO_3PO_4$, $Na_3Mn_{1/2}Mo_{1/2}CO_3PO_4$, $Na_3V_{1/2}Mo_{1/2}CO_3PO_4$, $K_3Fe_{1/2}Ni_{1/2}CO_3PO_4$, $K_3Fe_{1/2}Co_{1/2}CO_3PO_4$, $K_3Fe_{1/2}Mn_{1/2}CO_3PO_4$, $K_3Fe_{1/2}V_{1/2}CO_3PO_4$, $K_3Fe_{1/2}Mo_{1/2}CO_3PO_4$, $K_3Ni_{1/2}Co_{1/2}CO_3PO_4$, $K_3Ni_{1/2}Mn_{1/2}CO_3PO_4$, $K_3Ni_{1/2}V_{1/2}CO_3PO_4$, $K_3Ni_{1/2}Mo_{1/2}CO_3PO_4$, $K_3Co_{1/2}Mn_{1/2}CO_3PO_4$, $K_3Co_{1/2}V_{1/2}CO_3PO_4$, $K_3Co_{1/2}Mo_{1/2}CO_3PO_4$, $K_3Mn_{1/2}V_{1/2}CO_3PO_4$, $K_3Mn_{1/2}Mo_{1/2}CO_3PO_4$, or $K_3V_{1/2}MO_{1/2}CO_3PO_4$.

In other embodiments, M is a trivalent cation and the compound has the formula:

$$A_x(M)(PO_4)_a(CO_3)_b,$$

where x is between about 1.9 and about 2.1, and A, M, a, and b, are the same as those discussed above. As non-limiting examples, x may be 2 in certain instances; M may be a single trivalent cation; a may be between about 0.1 and about 5.1; and/or b may be between about 0.1 and about 5.1. One non-limiting example of a trivalent cation is $Al^{3+}$. For instance, a compound may have a formula $A_2M(PO_4)(CO_3)$, such as $Li_2M(PO_4)(CO_3)$, $Na_2M(PO_4)(CO_3)$, or $K_2M(PO_4)(CO_3)$, e.g., $Li_2Al(PO_4)(CO_3)$, $Na_2Al(PO_4)(CO_3)$, or $K_2Al(PO_4)(CO_3)$.

In still other embodiments, the compound may contain a bivalent and a trivalent cation. For instance, the compound may have the formula:

$$A_x(M_y)(M'_z)(PO_4)_a(CO_3)_b,$$

where M is a single bivalent cation and M' is a single trivalent cation. These variables (e.g., A, M, a, b, x, y, and z) may otherwise be the same as those discussed above. In some (but not all) cases, for charge neutrality, the quantity (x+2y+3z) may be between about 4.5 and about 5.5, between about 4.7 and about 5.3, or between 4.9 and about 5.1. In some cases, the quantity (x+2y+3z) may be about 5. Examples of such compounds include, but are not limited to, $Li_xFe_yAl_zCO_3PO_4$, $Li_xNi_yAl_zCO_3PO_4$, $Li_xCo_yAl_zCO_3PO_4$, $Li_xMn_yAl_zCO_3PO_4$, $Li_xV_yAl_zCO_3PO_4$, $Li_xMo_yAl_zCO_3PO_4$, $Na_xFe_yAl_zCO_3PO_4$, $Na_xNi_yAl_zCO_3PO_4$, $Na_xCo_yAl_zCO_3PO_4$, $Na_xMn_yAl_zCO_3PO_4$, $Na_xV_yAl_zCO_3PO_4$, $Na_xMo_yAl_zCO_3PO_4$, $K_xFe_yAl_zCO_3PO_4$, $K_xNi_yAl_zCO_3PO_4$, $K_xCo_yAl_zCO_3PO_4$, $K_xMn_yAl_zCO_3PO_4$, $K_xV_yAl_zCO_3PO_4$, or $K_xMo_yAl_zCO_3PO_4$. Additional non-limiting examples include $Li_xCr_yAl_zCO_3PO_4$, $Na_xCr_yAl_zCO_3PO_4$, $K_xCr_yAl_zCO_3PO_4$, $Li_xCu_yAl_zCO_3PO_4$, $Na_xCu_yAl_zCO_3PO_4$, $K_xCu_yAl_zCO_3PO_4$, $Li_xTi_yAl_zCO_3PO_4$, $Na_xTi_yAl_zCO_3PO_4$, $K_xTi_yAl_zCO_3PO_4$, $Li_xBi_yAl_zCO_3PO_4$, $Na_xBi_yAl_zCO_3PO_4$, $K_xBi_yAl_zCO_3PO_4$, $Li_xSn_yAl_zCO_3PO_4$, $Na_xSn_yAl_zCO_3PO_4$, $K_xSn_yAl_zCO_3PO_4$, $Li_xSb_yAl_zCO_3PO_4$, $Na_xSb_yAl_zCO_3PO_4$, or $K_xSb_yAl_zCO_3PO_4$.

In one set of embodiments, the compound is not $Na_3Fe(PO_4)(CO_3)$, $Na_3Mg(PO_4)(CO_3)$, $Na_3Mn(PO_4)(CO_3)$, and/or $Na_3Sr(PO_4)(CO_3)$. In another set of embodiments, the compound is selected such that the compound is not one wherein when A is Na, x is between 2 and 4, and M is Fe, Mg, Mn, or Sr. However, in other embodiments, any of these compounds may also be included.

The compounds described above typically include phosphate ($PO_4$) and carbonate ($CO_3$). However, it should be understood that this is by way of example only, and that in other embodiments, other polyanionic groups may be present, instead of or in addition to phosphate and/or and carbonate. For example, in one set of embodiments, the compound may have the formula:

$$A_xM_y(YO_4)_a(XO_3)_b.$$

In this formula, A is an alkali metal (e.g., Li, Na, K, etc.), X includes one or more of B, C, and/or N, and Y includes one or more of Si, P, As, S, V, Nb, Mo, and/or W. M may comprise one or more cations. As examples, M may comprise one or more non-alkali metal cations, one or more metal cations having more than one oxidation state above the ground state (i.e., $M^0$), one or more non-alkaline earth metal cations, one or more bivalent or trivalent cations, one or more transition metal ions, or the like, e.g., as previously discussed, as well as combinations of these (e.g., M may comprise one or more cations that are not alkali metals and are not alkaline earth metals). In some embodiments, Y may be selected from the group consisting of P, Si, S, and V.

a may be between about 0.1 and about 5.1, between about 0.1 and about 4.1, between about 0.2 and about 4.1, between about 0.3 and about 3.1, between about 0.4 and 2.1, between about 0.5 and about 1.5, between about 0.7 and about 1.3, or between about 0.9 and about 1.1. b may also be between about 0.1 and about 5.1, between about 0.1 and about 4.1, between about 0.2 and about 4.1, between about 0.3 and about 3.1, between about 2.9 and about 3.1, between about 0.4 and 2.1, between about 0.5 and about 1.5, between about 0.7 and about 1.3, or between about 0.9 and about 1.1. In some embodiments, a is about 1, and/or b is about 1. In addition, y may be greater than about 0.1. For example, y may be between about 0.1 and about 5.1, between about 0.1 and about 4.1, between about 0.2 and about 4.1, between about 0.3 and about 3, between about 0.4 and 2.1, between about 0.5 and about 1.5, between about 0.7 and about 1.3, or between about 0.9 and about 1.1. y may also be 1 in some instances. x may also be greater than about 0.1. For example, x may be between about 0.1 and about 5.1, between about 0.1 and about 4.1, between about 1.5 and about 10.1, between about 1.9 and about 10.1, between about 0.2 and about 4.1, between about 1.5 and about 3.5, between about 1.7 and about 3.3, between about 1.9 and about 3.1, between about 1.8 and about 2.2, between about 1.9 and about 2.1, between about 2.8 and about 3.2 or between about 2.9 and about 3.1. For example, x may be 2 or 3 in some cases.

In one set of embodiments, X and Y are selected from one of the following combinations for X and Y, respectively: C, P; B, P; B, Si; C, Si; C, S; B, S; N, P; N, Si; N, S; C, V; B, V; or N, V. For example, in certain embodiments as previously discussed, X may be C and Y may be P.

Non-limiting examples of the compounds described above include $Li_x(M)(YO_4)_a(XO_3)_b$ or $Na_x(M)(YO_4)_a(XO_3)_b$. Specific examples of potentially suitable compounds include, but are not limited to, $Li_x(M)(PO_4)_a(CO_3)_b$, $Na_x(M)(PO_4)_a(CO_3)_b$, $Li_x(M)(PO_4)_a(BO_3)_b$, $Na_x(M)(PO_4)_a(BO_3)_b$, $Li_x(M)(SiO_4)_a(BO_3)_b$, $Na_x(M)(SiO_4)_a(BO_3)_b$, $Li_x(M)(SiO_4)_a(CO_3)_b$, $Na_x(M)(SiO_4)_a(CO_3)_b$, $Li_x(M)(SO_4)_a(CO_3)_b$, $Na_x(M)(SO_4)_a(CO_3)_b$, $Li_x(M)(SO_4)_a(BO_3)_b$, $Na_x(M)(SO_4)_a(BO_3)_b$, $Li_x(M)(PO_4)_a(NO_3)_b$, $Na_x(M)(PO_4)_a(NO_3)_b$, $Li_x(M)(SiO_4)_a(NO_3)_b$, $Na_x(M)(SiO_4)_a(NO_3)_b$, $Li_x(M)(SO_4)_a$ $(NO_3)_b$, $Na_x(M)(SO_4)_a(NO_3)_b$, $Li_x(M)(VO_4)_a(CO_3)_b$, $Na_x(M)(VO_4)_a(CO_3)_b$, $Li_x(M)(VO_4)_a(BO_3)_b$, $Na_x(M)(VO_4)_a(BO_3)_b$, $Li_x(M)(VO_4)_a(NO_3)_b$, or $Na_x(M)(VO_4)_a(NO_3)_b$. Other combinations are also possible, in other embodiments of the invention.

In one set of embodiments, the compound does not include any of the following combinations for A, M, Y, and X, respectively: Na, Al and Co, Si, N; Na, Fe, Si, B; Na, Al and Co, Si, C; Na, Mn, P, C; Na, Fe, P, C; Na, Co, P, B; Na, Mg and Fe, S, C; Na, Fe, S, C; Li, Cu, P, B; and Li, Zn, P, B. However, in other embodiments, any of these compounds may also be included.

In some embodiments, more than one ($YO_4$) and/or ($XO_3$) may be present, including the above polyanions including Y and X and/or other polyanions. In some cases, other compounds may be present, for example, as dopants and/or impurities, or there may be variances in the compound due to manufacturing techniques or impurities in the starting compositions, or due to gaps, defects, or vacancies in the crystalline structure. However, in one set of embodiments, the amount of anionic oxide ($O^{2-}$) present within the compound may be kept at relatively low levels. For example, the compound may have no more than about 20 mol %, about 15 mol %, about 10 mol %, or about 5 mol % of anionic oxide present (as previously mentioned, anionic oxide, $O^{2-}$, is not polyanionic).

As mentioned, the compounds discussed herein may be stoichiometric or non-stoichiometric. In an off-stoichiometric compound, the ratio between the various cations is not exact or stoichiometric, and/or the ratio between the various anions is not exact or stoichiometric. For example, the ratio between the cations and anions, or the ratio between the cations and the anions within an off-stoichiometric compound may be 1:0.99, 1:0.98. 1:0.97, 1:0.96, 1:0.95, 1:094, 1:0.93, 1:0.92, 1:0.91, 1:0.90, 1:0.88, 1:0.86, 1:0.84, 1:0.82, 1:0.80, 1:0.78, 1:0.76, 1:0.74, 1:0.72, 1:0.70, etc., with either the cations or the anions being in excess, depending on the embodiment. As another example, the ratio between first and second cations (e.g., A or M) in a compound may not necessarily be a simple whole number ratio (e.g., 1:1, 2:1, 3:1, etc.), but may be a fraction, for example 1−w:1, 1+w:1, 2−w:1, 2+w:1, 3−w:1, 3+w:1, etc., where w is a decimal number, e.g., w may be 0.01, 0.02, 0.03, 0.04, 0.05, 0.06, 0.07, 0.08, 0.09, 0.10, 0.12, 0.14, 0.16, 0.18, 0.20, 0.22, 0.24, 0.26, 0.28, 0.30, etc. Thus, in any subscript in any formula described herein (including the implicit 1's in formulae such as $Li_3FeCO_3PO_4$), any one or more of the subscripts may independently be modified by the addition of a +w or a −w, where w is defined as described above.

Thus, as various non-limiting examples, a compound of the present invention may have a formula $A_{x-w}M_y(PO_4)_a(CO_3)_b$, $A_{x-w}M_y(YO_4)_a(XO_3)_b$, $A_{x-w}(M_y)(M'_z)(PO_4)_a(CO_3)_b$, $A_{x-w}(M_y)(M'_z)(YO_4)_a(XO_3)_b$, $A_{x-w}M_y(PO_4)_a(CO_3)_b$, $A_{x-w}M_y(YO_4)_a(XO_3)_b$, $A_{x-w}(M_y)(M'_z)(PO_4)_a(CO_3)_b$, $A_{x-w}(M_y)(M'_z)(YO_4)_a(XO_3)_b$, $A_xM_{y-w}(PO_4)_a(CO_3)_b$, $A_xM_{y-w}(YO_4)_a(XO_3)_b$, $A_x(M_y)_{1-w}(M'_z)(PO_4)_a(CO_3)_b$, $A_x(M_y)_{1-w}(M'_z)(YO_4)_a(XO_3)_b$, $A_x(M_y)(M'_z)_{1-w}(PO_4)_a(CO_3)_b$, $A_x(M_y)(M'_z)_{1-w}(YO_4)_a(XO_3)_b$, $A_xM_{y-w}(PO_4)_a(CO_3)_b$, $A_xM_{y-w}(YO_4)_a(XO_3)_b$, $A_x(M_y)_{1-w}(M'_z)(PO_4)_a(CO_3)_b$, $A_x(M_y)_{1-w}(M'_z)(YO_4)_a(XO_3)_b$, $A_x(M_y)(M'_z)_{1-w}(PO_4)_a(CO_3)_b$, $A_x(M_y)(M'_z)_{1-w}(YO_4)_a(XO_3)_b$, $A_xM_y(PO_4)_{a-w}(CO_3)_b$, $A_xM_y(YO_4)_{a-w}(XO_3)_b$, $A_x(M_y)(M'_z)(PO_4)_{a-w}(CO_3)_b$, $A_x(M_y)(M'_z)(YO_4)_{a-w}(XO_3)_b$, $A_xM_y(PO_4)_{a-w}(CO_3)_b$, $A_xM_y(YO_4)_{a-w}(XO_3)_b$, $A_x(M_y)(M'_z)(PO_4)_{a-w}(CO_3)_b$, $A_x(M_y)(M'_z)(YO_4)_{a-w}(XO_3)_b$, $A_xM_y(PO_4)_a(CO_3)_{b-w}$, $A_xM_y(YO_4)_a(XO_3)_{b-w}$, $A_x(M_y)(M'_z)(PO_4)_a(CO_3)_{b-w}$, $A_x(M_y)(M'_z)(YO_4)_a(XO_3)_{b-w}$, $A_xM_y(PO_4)_a(CO_3)_{b-w}$, $A_xM_y(YO_4)_a(XO_3)_{b-w}$, $A_x(M_y)(M'_z)(PO_4)_a(CO_3)_{b-w}$, $A_x(M_y)(M'_z)(YO_4)_a(XO_3)_{b-w}$, or the like. The other variables in these formulae (e.g., A, x, M, M', Y, X, a, b, etc.) may otherwise be the same as those described anywhere herein. w may also be 0 in other embodiments (i.e., such that the compound is stoichiometric). In addition, as noted above, more than one cation and/or anion may be off-stoichiometric in some cases, for example, as in $A_{x-w}M_{y-v}(PO_4)_a(CO_3)_b$, $A_{x-w}M_y(PO_4)_{a-v}(CO_3)_b$, $A_{x-w}M_y(PO_4)_a(CO_3)_{b-v}$, $A_{x-w}M_{y-v}(PO_4)_{a-u}(CO_3)_b$, etc., where u and v are independently selected but defined similarly to w above.

Figure 4:
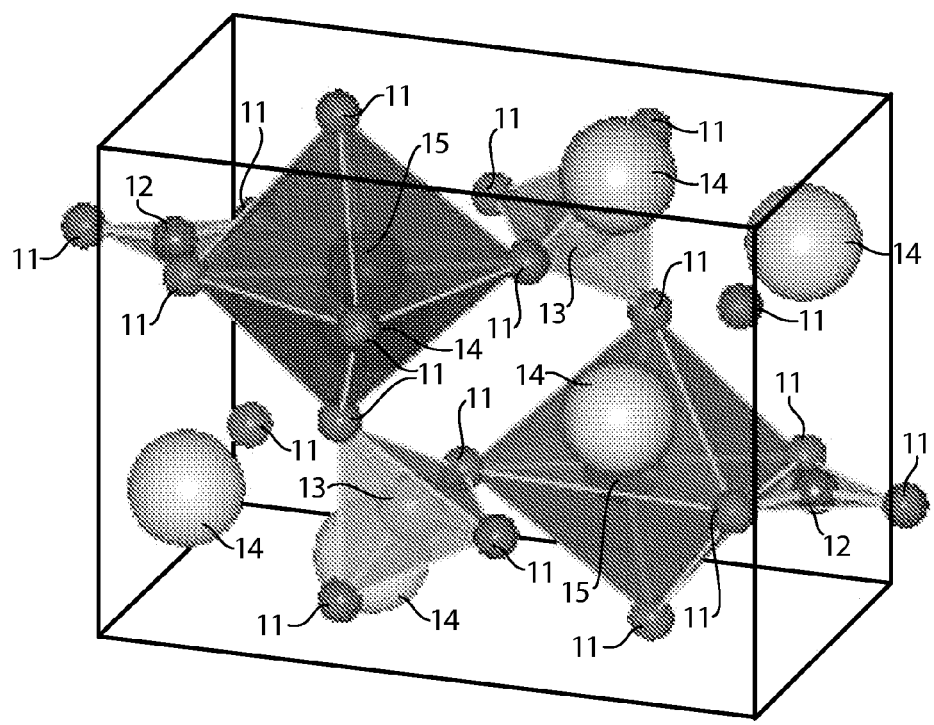
FIG. 4 illustrates a crystal unit cell in accordance with one embodiment of the invention.

In one aspect, the compound may have a structure such that the unit cell atomic arrangement is isostructural to a sidorenkite unit cell, a bonshtedtite unit cell, a bradleyite unit cell, a crawfordite unit cell, or a ferrotychite unit cell. An example unit cell is shown in FIG. 4. As used herein, "isostructural" means that the atoms in the structure are topologically arranged in 3-dimensional space in the same configuration (for example, the oxygen atoms, cations, anions, etc. are positioned in the same topological locations), although the exact dimensions or lattice parameters in the compound (e.g., the spacing between atoms) may be different than the corresponding unit cells. For example, a sidorenkite unit cell, a bonshtedtite unit cell, and a bradleyite unit cell are isostructural to each other. Those of ordinary skill in the art will be able to determine the unit cell and/or atomic positions of a compound of the present invention, using well-established techniques for determining unit cell lattice parameters, dimensions, atomic positions, etc., for example, using crystallographic techniques such as X-ray diffraction, neutron diffraction, or electron diffraction.

In some embodiments, the compound has a unit cell belonging to Space Group Number 11, as defined by the International Union of Crystallography. This structure is monoclinic, and has the International Short Symbol (P12$_1$/m1). Thus, the compound may be one that adopts a monoclinic P21/m (11) space group structure. A specific non-limiting example of a unit cell structure is shown in FIG. 4. In this figure, oxygen atoms are indicated by 11, X atoms (e.g., carbon) are indicated by 12, Y atoms (e.g., phosphorous) are indicated by 13, A atoms (e.g., sodium) are indicated by 14, and M atoms (e.g., manganese) are indicated by 15. In one embodiment, the lattice vectors length are 8.997, 6.741, and 5.163, and the lattice vectors angle are 90°, 90.16°, and 90°. In some embodiments, however, some relaxation of the structure may occur, e.g., such that the structure relaxes from monoclinic to triclinic (P1), e.g., after some ion exchange has occurred.

In one set of embodiments, the compound may have a unit cell comprising $CO_3$ triangular planar groups (or other $XO_3$ triangular planar groups), $PO_4$ tetrahedral groups (or other $YO_4$ tetrahedral groups), and/or $MO_6$ octahedral groups. M may be a positive cation, for instance, a positive bivalent or trivalent cation, or other cations as described herein with respect to M. In some cases, the $MO_6$ octahedral group (e.g., the cluster around atom 15 in FIG. 4) may share an edge with a carbonate $CO_3$ or other $XO_3$ triangular planar group (e.g., the cluster around atom 12 in FIG. 4), and/or the $MO_6$ octahedral group may share 4 vertices with $PO_4$ or other $YO_4$ tetrahedral groups (e.g., the cluster around atom 13).

As a specific example, in one embodiment, a compound of the invention may be determined using an X-ray diffractometer having a copper K alpha source with a wavelength of 1.5418 angstrom. The XRD diffraction pattern may have maxima at 2 thetas (2θ) of 10.7±1, 20.4±1, 21.4±1, 27.1±1, 28.8±1, 34.0±1, and 35.8±1 degrees. Other example spectra can be seen in FIG. 1. In some embodiments, the compound may have a spectrum similar to those seen in FIG. 1, e.g., such that the person of ordinary skill in the art would agree that the compound has a spectrum that is essentially identical to one of those shown in FIG. 1.

In some cases, the compound is thermodynamically unstable at 25° C. and 1 atm. As used herein, the phrase "thermodynamically unstable" means that under such conditions, the compound may begin substantially degrading, without any external inputs (e.g., temperature changes, other reactants, energy, etc.), into other compounds or formulations having lower thermodynamic energy over a nominal time scale, such as within 1 year or within 5 years. For instance, by way of example only, some carbonate-containing compounds will degrade by releasing carbonate as carbon dioxide ($CO_2$). However, for many compounds, kinetic limitations prevent a compound from degrading even in conditions in which it is thermodynamically unstable.

In some embodiments, the compound is thermally stable. For example, the compound may be sufficiently stable that it does not substantially decompose upon exposures to temperatures of 200° C., 250° C., 300° C., 350° C., 400° C., 450° C. or even 500° C. (e.g., at 1 atm), e.g., forming smaller decomposition compounds (for example, CO or $CO_2$) in an irreversible process. In some cases, the compound is sufficiently stable that it exhibits no more than about 3 ml/g of oxygen release when heated to a temperature of 250° C. or 300° C. In some cases, the compound may release no more than about 1 ml/g, about 0.3 ml/g, about 0.1 ml/g, or about 0.3 ml/g of oxygen upon exposure to such temperatures. Without wishing to be bound by any theory, it is believed that the thermal stability and/or the inability of the compound to release oxygen may be due to the presence of polyanionic groups within the compound, e.g., phosphate ($PO_4$) and/or carbonate ($CO_3$), unlike other compounds such as $Li_xCoO_2$ which do not contain such polyanionic groups. As previously mentioned, in some embodiments, the compound contains no more than about 20 mol %, about 15 mol %, about 10 mol %, or about 5 mol % of anionic (non-polyanionic) oxide.

The thermal stability of the compound may be determined using any suitable technique. One non-limiting example is differential scanning calorimetry (DSC). Thus, for example, the compound may exhibit no thermal transitions below 200° C., 250° C., 300° C., 350° C., or 400° C. when analyzed using differential scanning calorimetry (DSC). Examples of thermal transitions include glass transition ($T_g$) and/or melting ($T_m$) transitions.

In one set of embodiments, the compound has a specific capacity of at least about 50 mA h/g, and in some cases, at least about 60 mA h/g, at least about 80 mA h/g, at least about 100 mA h/g, at least about 120 mA h/g, at least about 140 mA h/g, at least about 160 mA h/g, at least about 180 mA h/g, at least about 200 mA h/g, at least about 210 mA h/g, at least about 220 mA h/g, or at least about 230 mA h/g, etc. as measured at a discharge rate of C/50 (C=116 mA/g). The compound may be, for example, a lithium-containing compound comprising at least two different polyanionic groups, a compound having the formula $Li_x(M)(PO_4)_a(CO_3)_b$, $A_x(M)(PO_4)_a(CO_3)_b$, $A_x(M)(YO_4)_a(XO_3)_b$, or any other compound disclosed herein. Such specific capacities may be measured, for example, by using the relevant compound as a positive electrode in an electrochemical cell against a Li anode, charging the compound to a maximum of 4.6 V, 4.9 V, or 5.2 V (relative to the potential of $Li^+/Li$, i.e., relative to the potential of $Li^+$ in Li metal, e.g., in a Li anode), then discharging the compound to 2.0 V at a rate of at least about 116 mA/g. The current density of the compound, when used as an electrode, may be less than about 1 $mA/cm^2$ of electrode surface.

In some embodiments, various compositions as discussed herein can be selected and/or optimized, e.g., for use in batteries and/or other electrochemical devices, based on screening tests, for example, based on charging or cycling profiles. For instance, a composition may be formed into a cathode in an electrochemical cell and charged against a lithium anode. By exposing the compound to various voltages (e.g., 4.6 V, 4.9 V, or 5.2 V, relative to the potential of $Li^+/Li$), then discharging the compound to 2.0 V at a rate of at least about 116 mA/g, the performance of various compositions can be ascertained, and used to select or optimize compositions for use in a particular battery and/or other electrochemical device. A compound may be selected to have a specific capacity of at least about 50 mA h/g, and in some cases, at least about 60 mA h/g, at least about 80 mA h/g, at least about 100 mA h/g, at least about 120 mA h/g, at least about 140 mA h/g, at least about 160 mA h/g, at least about 180 mA h/g, at least about 200 mA h/g, at least about 210 mA h/g, at least about 220 mA h/g, or at least about 230 mA h/g, etc. As another example, the compound may be repeated charged and discharged as described above, with better or more optimized compounds yielding better charging characteristics after more charge/discharge cycles.

According to various aspects of the invention, compounds such as those described herein may be used for a wide variety of purposes. In some embodiments, the compound may be present within a composition which can optionally include other materials, such as binders, fillers, hardeners, or the like. For instance, in one set of embodiments, the compound may be present within an electrochemical device, for example, as a battery material, for use in applications such as power tools, hybrid electric vehicles, portable electronic devices, laptop computers, and the like. In some such embodiments, the compounds of the invention may be able to store charge, e.g., electronic charge. For example, the compounds may be present in an electrode within a suitable electrochemical device, e.g., as a positive electrode within a battery, fuel cell, etc.

As a specific example, in some embodiments, a compound as discussed herein may be used within a rechargeable alkali metal battery, for example, within or as an electrode. A rechargeable alkali metal battery, such as a lithium battery or a sodium battery, typically has electrodes that exchange lithium or sodium, respectively, during charge and discharge. The rate at which the alkali metal ions can be exchanged is important in many applications where high charge and/or discharge rates are required for the battery. For a cathode material, alkali metal ions and electrons are adsorbed during the discharge of the battery, and this process is reversed during the charge. Though the present invention is not limited to cathodes, as used herein, "charging" indicates removal of alkali metal ions form the material and "discharging" refers to insertion of alkali metal ions from the material.

Another aspect of the present invention is generally directed to systems and techniques for making compounds such as the one described herein. For example, in certain embodiments, a hydrothermal technique may be used to prepare the compounds. In some embodiments, an aqueous liquid containing various salts (e.g., a solution or a suspension, etc.) is heated, then the water is removed to recover the final compound. The liquid may contain various salts containing ions that will be used to form the final compound, which may be dissolved and/or suspended in the liquid. It should be understood that a "liquid," as used herein, also includes species that are contained within the liquid, e.g., dissolved or suspended therein, as in a solution or a suspension. As a specific example, a liquid may contain a phosphate anion, a carbonate anion, an alkali metal cation, and a non-alkali metal cation.

In the liquid, positive ions that should be present in the final compound may be balanced by suitable negative ions to produce the final desired product. As a specific non-limiting example, if $Na_3MnCO_3PO_4$ is to be produced, the starting salts may include $Na_2CO_3$, $Na_3PO_4$, $MnCO_3$, and/or $Mn_3(PO_4)_2$. To control the ratio of species in the final desired product, other entities may also be used that can be removed during the synthesis process. For instance, nitrates ($NO_3^-$) or ammonium species ($NH_4^+$) may be used. Thus, as a specific example, $NaNO_3$ or $Mn(NO_3)_2$ could be used to increase the amount of Na or Mn, respectively, while $(NH_4)_2CO_3$ or $(NH_4)_3PO_4$ could be used to increase the amount of $CO_3$ or $PO_4$, respectively, in the final product. Those of ordinary skill in the art will be able to prepare starting liquids (e.g., solutions and/or suspensions) containing the correct amounts of positive and negative species to produce a desired final product without an undue degree of experimentation, by calculating molar ratios or using other similar techniques.

For instance, in one set of embodiments, the initial liquid may be prepared by adding a first compound comprising an alkali metal cation and a carbonate anion, a second compound comprising a non-alkali metal cation and a nitrate anion, and a third compound comprising a phosphate anion, to water to form the aqueous liquid. In another set of embodiments, the initial liquid may be prepared by adding a first compound comprising an alkali metal cation and a carbonate anion; a second compound comprising a chlorine anion, a sulfate anion, a bromine anion, and an iodine anion; and a third compound comprising a phosphate anion, to water to form the aqueous liquid. According to yet another set of embodiments, the initial liquid may be prepared by adding a first compound comprising an alkali metal cation, a second compound comprising a non-alkali metal cation, a third compound comprising a carbonate anion, and a fourth compound comprising a phosphate anion, to water to form the aqueous liquid.

For example, if the final compound has a formula $A_x(M)(PO_4)_a(CO_3)_b$, where A comprises one or more alkali metals, M comprises one or more non-alkali metal cations, x is greater than about 0.1, a is between about 0.1 and about 5.1, and b is between about 0.1 and about 5.1, then the initial may be formed from a first compound comprising an alkali metal cation and a phosphate anion, and a second compound comprising a non-alkali metal cation and a carbonate anion; or a first compound comprising an alkali metal cation and a carbonate anion, and a second compound comprising a non-alkali metal cation and a phosphate anion; or the like. For example, the ratio of alkali metal cation to phosphate anion in an aqueous solution may be, for example, between about 5:0 and about 1:50, between about 5:0.1 and about 1:10, between about 5:0.1 and about 1:5, between about 1:0.1 and about 1:50, between about 1:0.1 and about 1:10, between about 1:0.1 and about 1:5, or about 1:1. Similarly, in some cases, the ratio of alkali metal cation to carbonate anion in the aqueous solution may be, for example, between about 5:0 and about 1:50, between about 5:0.1 and about 1:10, between about 5:0.1 and about 1:5, between about 1:0.1 and about 1:50, between about 1:0.1 and about 1:10, between about 1:0.1 and about 1:5, or about 1:1. In some embodiments, the ratio of phosphate anion to carbonate anion may be between about 1:0.1 and about 1:10, between about 1:0.5 and about 1:2, or about 1:1. In one set of embodiments, the ratio of alkali metal cation to non-alkali metal cation is between about 1:0.1 and about 1:10, between about 1:0.2 and about 1:5, or between about 1:0.5 and about 1:2.

In some embodiments, the synthesis and/or ion exchange of certain compounds, such as those described herein (for instance, certain Li or Na iron carbonophosphates), may be carried out in a glove box, or other sealed reactor, such as a hydrothermal bomb. In some cases, the glove box or other reactor may contain an inert gas, such as pure nitrogen or a noble gas, e.g., to minimize exposure to oxygen. Without wishing to be bound by any particular theory, oxygen (e.g., in the air) in the environment or dissolved in the hydrothermal solution may, in some cases, oxidize $Fe^{2+}$ to $Fe^{3+}$. This oxidation reaction may result in an off-stoichiometric formulation of the iron carbonophosphates, e.g. the formula of the product becomes $A_{3-w}Fe(II)_{1-w}Fe(III)_wPO_4CO_3$. A may be Li or Na. The oxidation reaction may be written as:

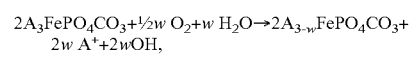

where A represents Na or Li. In other embodiments, however, such compounds may be desirable.

In certain cases, however, the synthesis and/or ion exchange of certain compounds, such as those described herein (for example, certain Co or Ni carbonophosphates), may be performed with or without necessarily removing oxygen from the surrounding environment. Due to the stability of certain species such as Co(II) and Ni(II) against oxygen, there may be no need to remove oxygen from the surrounding environment. As another example, the synthesis and/or ion exchange of Mn carbonophosphates may be performed out with removing oxygen from the surrounding environment, since Mn(II) is generally more stable than Fe(II) against oxidation under operating conditions. While the oxidation of Mn(II) may occur, it typically oxidizes very slowly. Thus, there may be no need to remove oxygen from the surrounding environment.

The initial liquid may be prepared by dissolving and/or suspending the salts in water (or a solution, suspension, or other mixture in which water is present), and/or heating the liquid to a controlled temperature, sequentially and/or simultaneously, for example, at least about 50° C., at least about 60° C., at least about 70° C., at least about 80° C., at least about 90° C., at least about 100° C., at least about 110° C., at least about 120° C., at least about 130° C., at least about 140° C., at least about 150° C., at least about 160° C., at least about 170° C., at least about 180° C., at least about 190° C., at least about 200° C., or at least about 210° C. In certain embodiments, the temperature may be below about 220° C., about 210° C., or about 200° C. In some cases, the temperature and/or pressure of the liquid may be controlled during the heating process such that the aqueous solution is not boiled off.

After suitable exposure to such conditions (e.g., after 2, 3, 4, or more days), water may be removed using any suitable technique to produce the final product. For example, the liquid may be exposed to relatively high temperatures under dry (low-humidity) air, or by centrifugation separation to drive off excess water, thereby producing the final product. Techniques for drying solutions or suspensions will be familiar to those of ordinary skill in the art. In some cases, the final product may be recovered as a solid product, for instance, a crystalline product.

In some embodiments, the final product may be formed as particles. The particle size may be controlled, for example, by controlling the temperature and/or the time of formation. For instance, the particles may have an average diameter of between about 200 nm to about 10 micrometers, between about 200 nm and about 300 nm, between about 300 nm and about 1 micrometer, between about 1 micrometer and about 3 micrometers, or between about 3 micrometers and about 10 micrometers. The average diameter may be estimated, e.g., using SEM or TEM. In some cases, the particles may have a relatively narrow size distribution. For example, as observed using SEM or TEM, the particles may have a size such that at least about 50%, at least about 60%, at least about 70%, about 80%, at least about 85%, at least about 90%, or at least about 95% of the particles appears to have a diameter or volume that is no more than about 10% different, or no more than about 5% different from the average diameter or volume of the particles.

The invention also involves, in some aspects, the promotion of the use of a compound according to any of the techniques or compounds described herein. As used herein, "promoted" includes all methods of doing business including, but not limited to, methods of selling, advertising, assigning, licensing, contracting, instructing, educating, researching, importing, exporting, negotiating, financing, loaning, trading, vending, reselling, distributing, replacing, or the like that can be associated with the methods and compounds of the invention, e.g., as discussed herein. Promoting may also include, in some cases, seeking approval from a government agency. Methods of promotion can be performed by any party including, but not limited to, businesses (public or private), contractual or sub-contractual agencies, educational institutions such as colleges and universities, research institutions, governmental agencies, etc. Promotional activities may include instructions or communications of any form (e.g., written, oral, and/or electronic communications, such as, but not limited to, e-mail, telephonic, facsimile, Internet, Web-based, etc.) that are clearly associated with the invention. As used herein, "instructions" can define a component of instructional utility (e.g., directions, guides, warnings, labels, notes, FAQs ("frequently asked questions"), etc., and typically involve written instructions on or associated with the compound and/or with the packaging of the compound. Instructions can also include instructional communications in any form (e.g., oral, electronic, digital, optical, visual, etc.), provided in any manner such that a user will clearly recognize that the instructions are to be associated with the compound, e.g., as discussed herein.

U.S. Provisional Patent Application Ser. No. 61/306,670, filed Feb. 22, 2010, entitled "Carbophosphate and Related Compounds," by Ceder, et al., is incorporated herein by reference in its entirety.

The following examples are intended to illustrate certain embodiments of the present invention, but do not exemplify the full scope of the invention.

Example 1

This example illustrates the synthesis of various sodium single-transition metal carbophosphate $Na_3MCO_3PO_4$ compounds, where M is Fe, Co, Mn, or Ni. These carbophosphate compounds were synthesized using hydrothermal methods. Additional sodium mixed-transition metal transition metal carbophosphates were also prepared using similar techniques, where M includes mixtures of Fe, Co, Mn, and Ni (but were not limited to these elements). For example, Cr or V could be mixed in the M site with the four elements above.

The lithium forms of these compounds were prepared by Li—Na ion exchange in organic solvents. The details of the synthesis procedure are described below with $Na_3MnCO_3PO_4$ and $Li_3MnCO_3PO_4$ as specific representative examples.

The starting materials used for the synthesis of $NaMnCO_3PO_4$ included soluble sodium salt, such as $Na_2CO_3$; soluble Mn salt, such as $Mn(NO_3)_2 \cdot 4H_2O$ or $Mn(NO_3)_2 \cdot 6H_2O$; soluble carbonates, such as $Na_2CO_3$; and soluble phosphates, such as $(NH_4)_2HPO_4$. As a representative procedure, 0.5 g of $Mn(NO_3)_2 \cdot 4H_2O$ was dissolved in 3 ml of distilled water to form a light pink solution (solution I); next, 2 g $Na_2CO_3$ and 0.264 g $(NH_4)_2HPO_4$ were dissolved in 12 ml distilled water to form a clear solution (solution II). Solution I was slowly added into solution II under strong magnetic stirring to form a light pink slurry. The slurry was transferred to a PTFE (polytetrafluoroethylene)-lined autoclaved and heated at 90° C. for three days, or at 160° C. for 16 hours. After the autoclave was cooled down to room temperature (about 25° C.), the final product was washed with distilled water 3 to 5 times and then dried at 90° C. overnight.

The starting materials could be other soluble salts which provide Na, Mn, $CO_3^{2-}$ or $PO_4^{3-}$ to the reaction, other than the salts listed above. The molar ratio of the starting materials could be varied accordingly.

The Li—Na ion exchange to synthesize $Li_3MnCO_3PO_4$ from as-prepared $NaMnCO_3PO_4$ was performed by stirring the powder of $NaMnCO_3PO_4$ in 2 M LiBr/1-hexanol solution for one week in a 90° C. oil bath. The temperature can also be between about 90° C. and about 135° C. The ion-exchanged product was washed by distilled water and methanol and dried at 70° C. overnight.

The same hydrothermal synthesis and ion-exchange procedures was used to synthesize other carbophosphates (M being Ni, Co, Fe or other metals), with the starting materials changed accordingly.

The XRD patterns of $Na_3MCO_3PO_4$ and their corresponding Li form $Li_3MCO_3PO_4$ (M=Mn, Fe, Co, Ni, and $Co_{0.5}Mn_{0.5}$) are shown in FIG. 1.

Example 2

Figure 2:
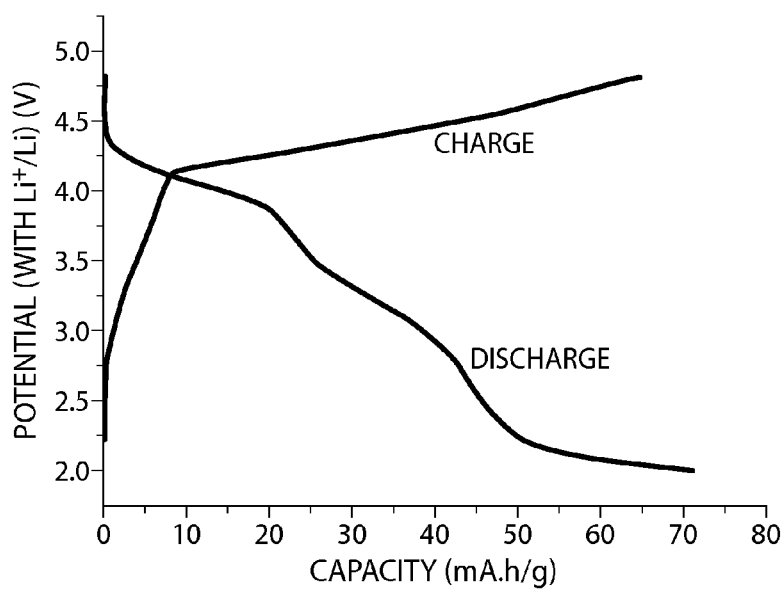
FIG. 2 illustrates a typical cycling profile for a compound according to one embodiment of the present invention.
Figure 3A:
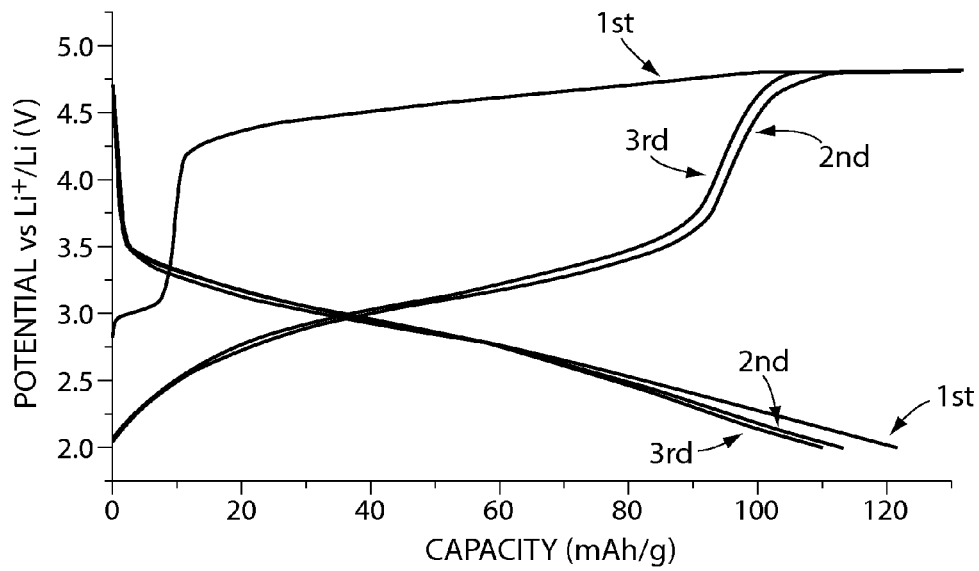
FIGS. 3A-3D illustrate various typical cycling profiles and discharge capacity retentions of certain compounds in accordance other embodiments of the invention.
Figure 3B:
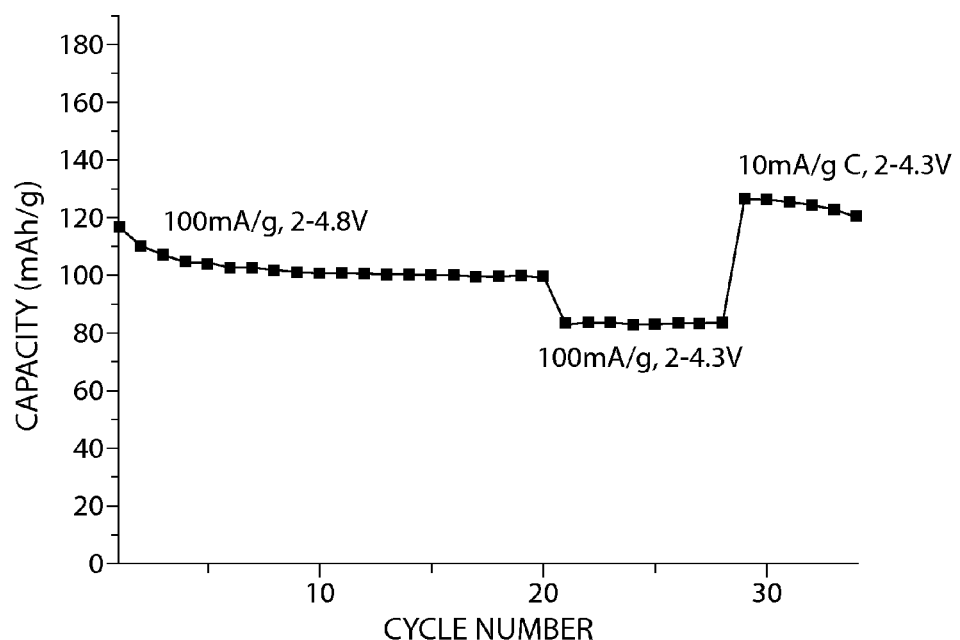

This example shows testing involving certain compounds discussed in Example 1. The as-prepared $Li_3MnCO_3PO_4$ and $Li_3FeCO_3PO_4$ compound were tested as the cathode in an experimental half-cell lithium ion battery. $Li_3MnCO_3PO_4$ or $Li_3FeCO_3PO_4$ was mixed with carbon black and PVDF (polyvinylidene fluoride) binders with a weight ratio of 60%:30%:10% and casted on an aluminum foil as the cathode. Lithium metal foil was used as anode. 1 M $LiPF_6$ in 1:1 EC/DMC (ethylene carbonate/dimethyl carbonate) solution was used as electrolyte. The cell was cycled by using a Maccor 4000 electrochemical cycler or an Arbin 2000 electrochemical cycler with galvanostatic mode. The current density used was 2 mA/g for $Li_3MnCO_3PO_4$ and from 2 mA/g to 1000 mA/g for $Li_3FeCO_3PO_4$. The voltage window was 2.0 V to 4.8 V. FIG. 2 shows a typical cycling profile of $Li_3MnCO_3PO_4$, with the charge and discharge voltage plotted as a function of capacity. The current density was 2 mA/g, and the cycling window was 2.0 V to 4.8 V. FIG. 3A shows a typical cycling profile of off-stoichiometric $Li_3FeCO_3PO_4$ in the first three cycles, with the charge and discharge voltage plotted as a function of capacity. The current density was 2 mA/g. FIG. 3B shows the capacity retention of $Li_3FeCO_3PO_4$ with different current densities at various rates. The off-stoichiometric samples also showed good rate capability and cycling retention.

Figure 3C:
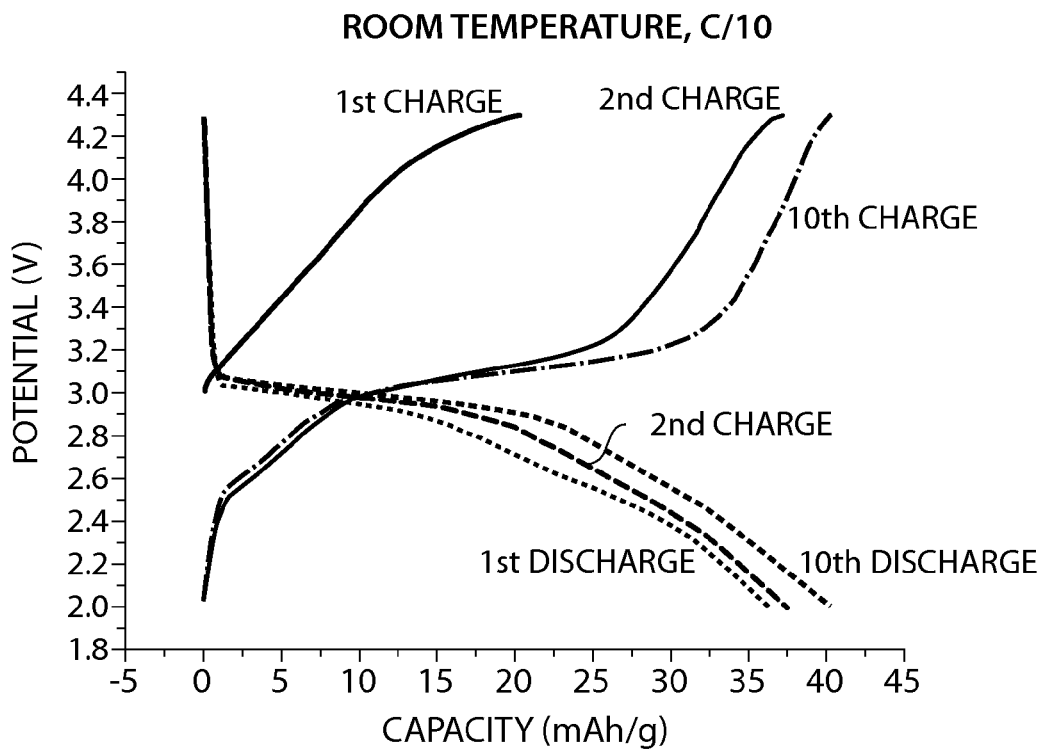
Figure 3D:
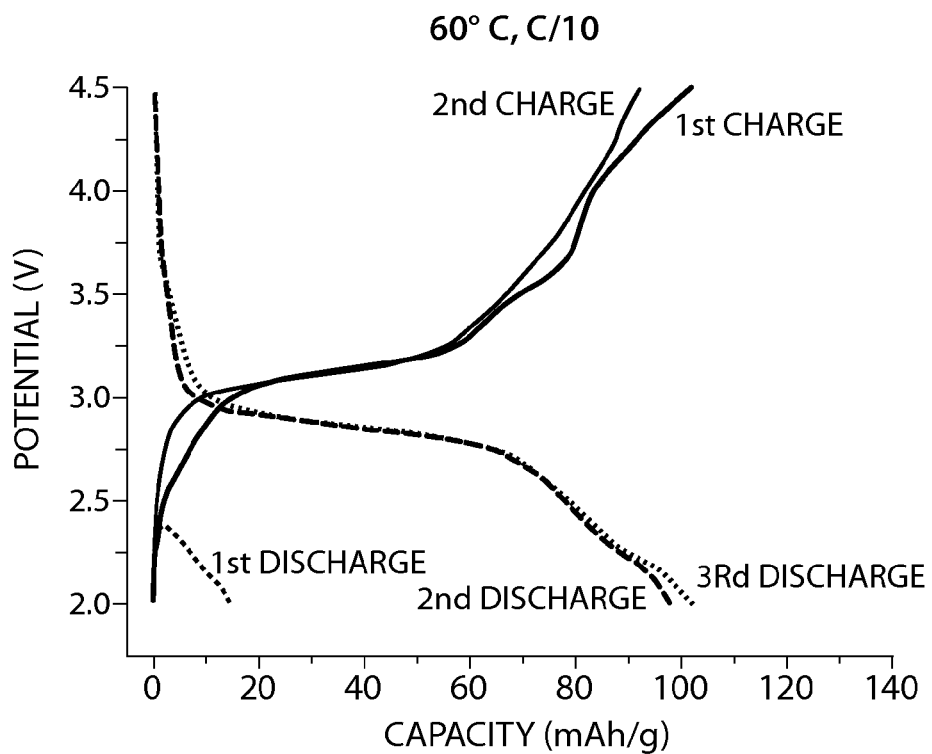

In addition, FIGS. 3C and 3D illustrate cyclic curves of stoichiometric $Li_3FeCO_3PO_4$ at room temperature (about 25° C.) and at 60° C., at C/10 rates. In addition, when cycled at an elevated temperature, the $Li_3FeCO_3PO_4$ showed smaller polarization.

Example 3

Without wishing to be bound by any theory, this example illustrates that certain compounds having the $YO_4$ and $XO_3$ polyanions discussed herein have a sidorenkite structure and the properties recited herein based on a density functional theory framework using the Generalized Gradient Approximation (GGA) with a Hubbard correction term (GGA+U).

Figure 5:
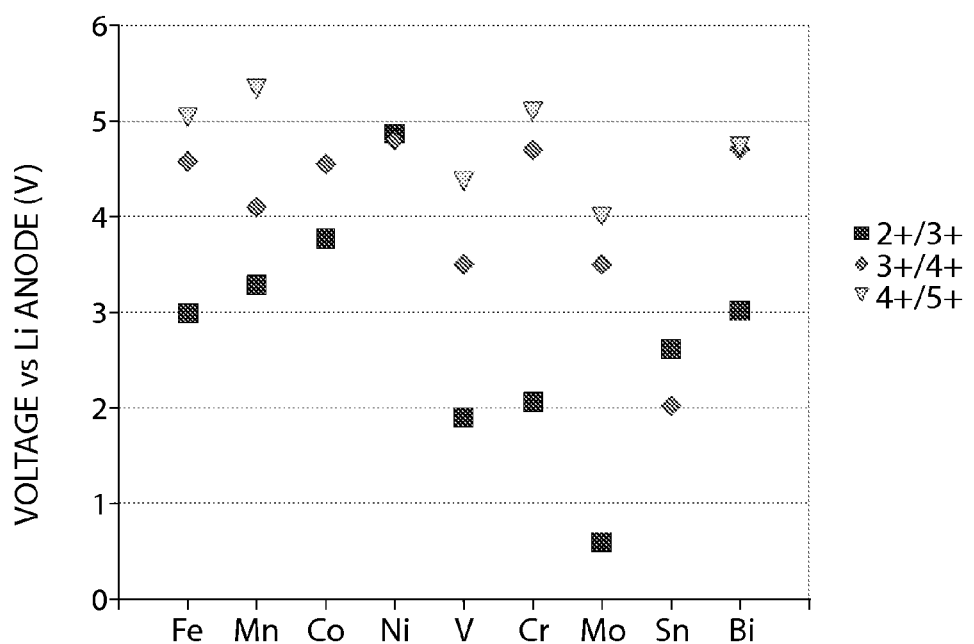
FIG. 5 illustrates voltages for certain redox active elements, for carbophosphate compounds, in one embodiment of the invention.

Voltages for different redox active elements M in the sidorenkite structure were computed, and are shown in FIG. 5. This figure also shows metal valence changes during the battery cycle (e.g., from 2+ to 3+, etc.). Mn, V, and Mo appear to be interesting, and the energy density for these elements are shown in Table 1.

TABLE 1

| redox couple | Grav. Energy density (Wh/kg) | Vol. Energy density (Wh/l) |
| --- | --- | --- |
| Mn2/4 | 859 | 2376 |
| Mo3/5 | 744 | 2285 |
| V3/5 | 968 | 2604 |

The thermodynamic stability for various $Li_xM(PO_4)(CO_3)$ compounds was estimated using ab initio computations. The results of the voltage computations are shown in FIG. 5. Many metals such as Fe, Mn, Co, V, Mo, and Bi display computational voltages which are suited to match the voltage limits of current electrolytes presently used in Li ion batteries. Other metals, including Ni and Cr are also interesting. The Li containing phases were found to be thermodynamically unstable; however, a few of them are only slightly higher in energy than the combination of phases with the lowest energy, so that they can be made in the lab by controlling the kinetics of the reactions, for example, as was shown in Example 1.

Analysis of certain $Na_xM(PO_4)(CO_3)$ isostructural compound showed that various sodium compounds are stable. For instance, for M elements in a 2+ oxidation state, $Na_3M(PO_4)(CO_3)$ appears stable for various elements, such as Fe, Mn, Mg, Ca, Co, Ni, Cu, Zn, etc. For M elements in a 3+ oxidation state, $Na_2M(PO_4)(CO_3)$ appears to be stable for V, Mo, Fe, Cr, Bi, Sc, Al, etc. Similarly, with potassium as an alkali, various compounds are also stable. For instance, for M elements in a 2+ oxidation state, $K_3M(PO_4)(CO_3)$ appears to be stable for Mg, Ca, Fe, Ni, Co, Sr, Mn, etc. For M elements in a 3+ oxidation state, $K_2M(PO_4)(CO_3)$ appears to be stable for Bi, Fe, Tl, Sb, Fe, Cr, Mn, etc. Accordingly, these computations illustrate that another approach for producing certain compounds of the invention involves first preparing a sodium compound or a potassium compound, then using ion-exchange to produce a lithium compound.

Figure 6A:
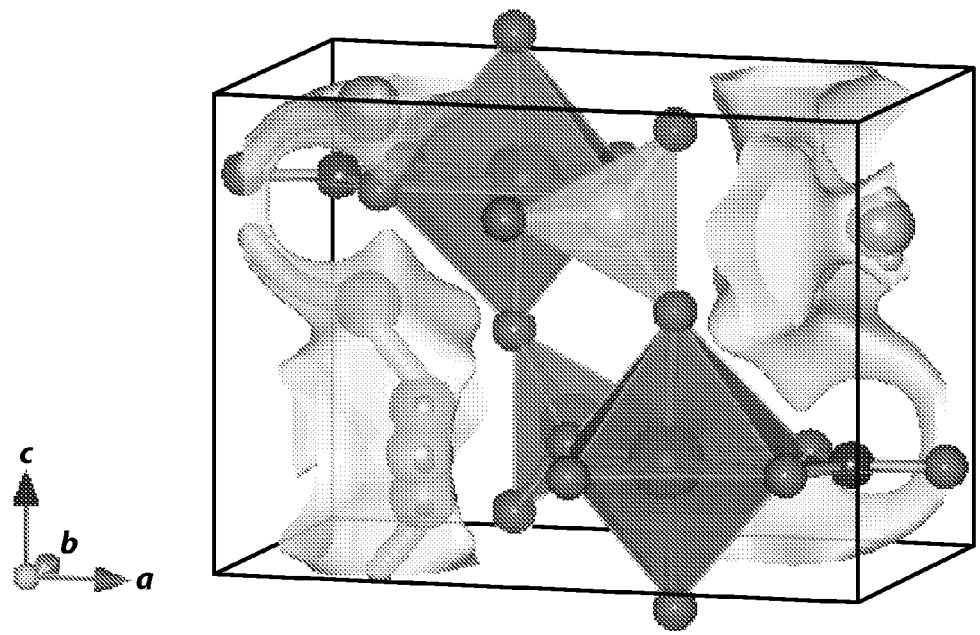
FIGS. 6A-6B illustrates Li diffusion paths in certain compounds in accordance with another embodiment of the invention.
Figure 6B:
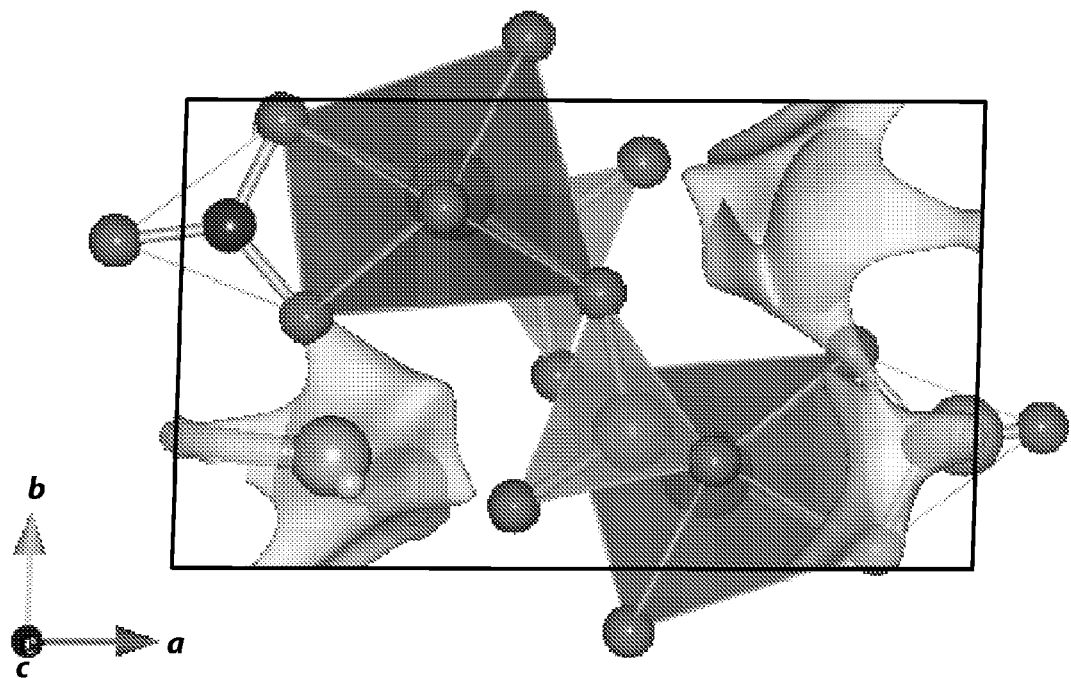

An empirical potential based on electrostatic interaction was also used to evaluate the Li diffusion path in certain compounds. FIGS. 6A and 6B show the diffusion paths of Li in the sidorenkite structure. The results from this analysis suggest that these compounds should exhibit good lithium ion diffusion. This diffusion was predicted to be 2-dimensional with the lowest barrier diffusion path along the b and c axis. See FIGS. 6A and 6B. The empirical potential barriers were estimated to be 521 meV, 394 meV, and 452 meV, respectively, for the Mn, Fe and V compounds.

Figure 8:
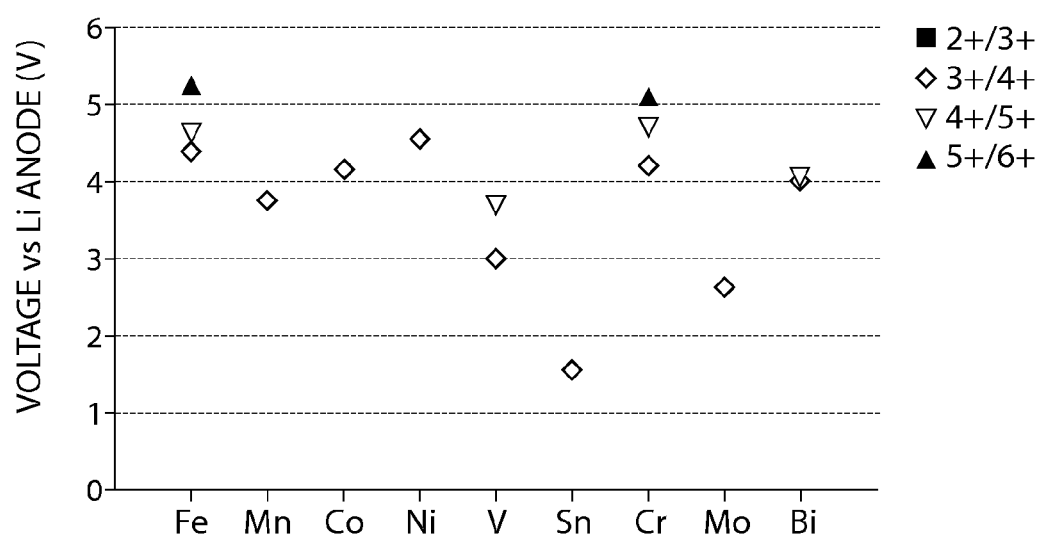
FIG. 8 illustrates voltages for various carbosilicates, in still another embodiment of the invention.
Figure 9:
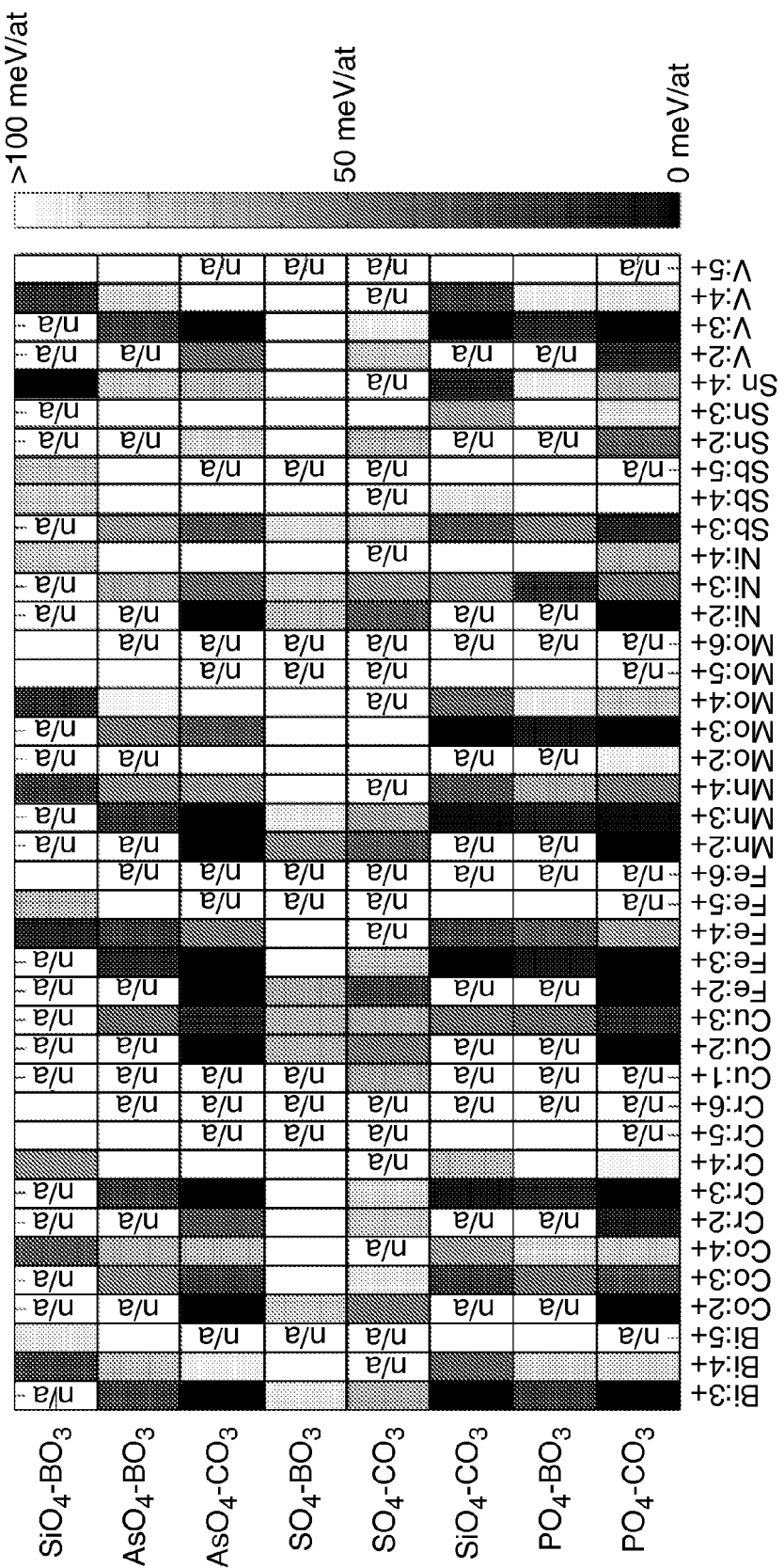
FIG. 9 illustrates the stability of certain sodium metal compounds having different combinations of $XO_4$ and $YO_3$ groups, in accordance with one embodiment of the invention.
Figure 10:
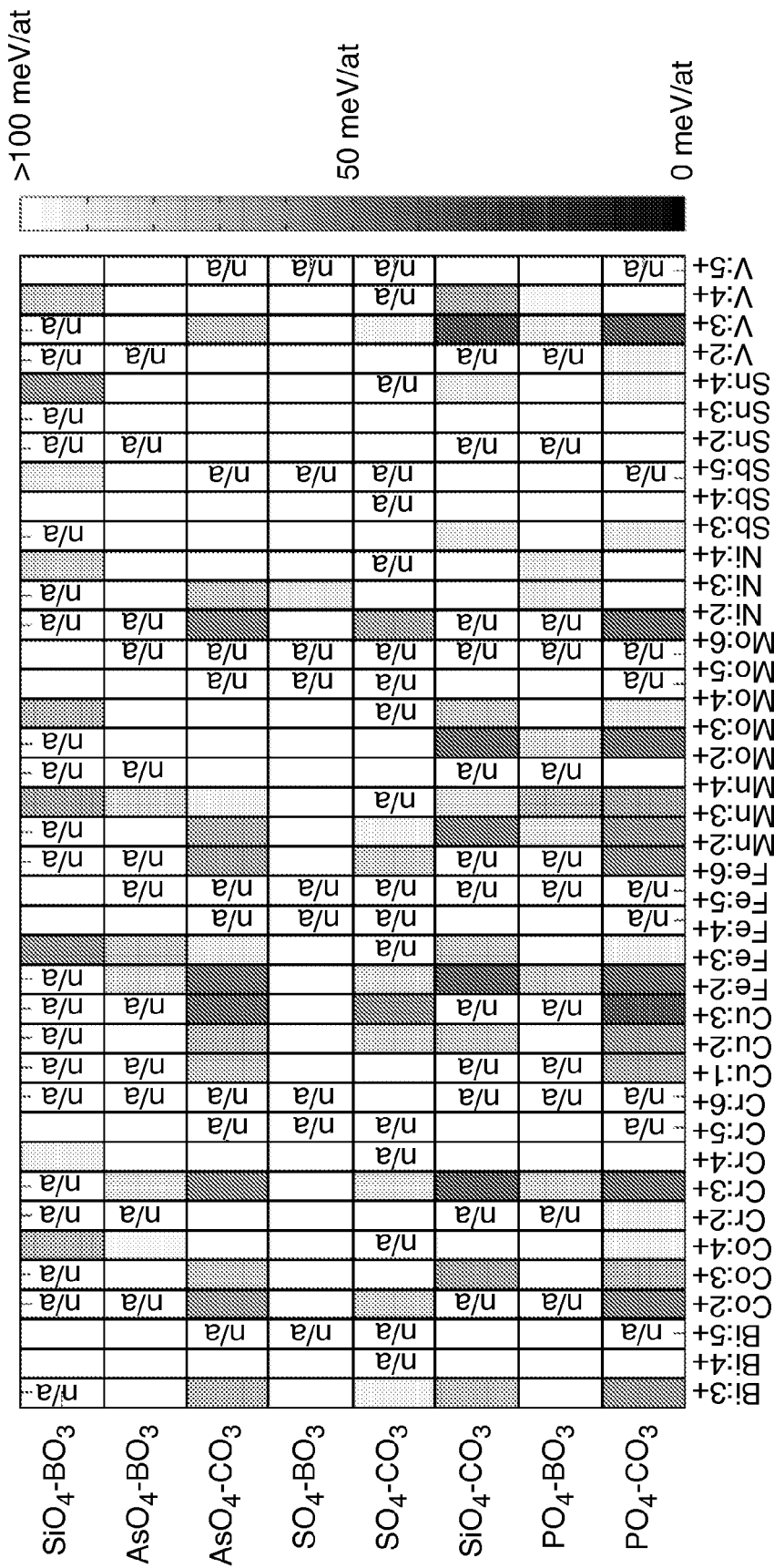
FIG. 10 illustrates the stability of certain lithium metal compounds having different combinations of $XO_4$ and $YO_3$ groups, in accordance with another embodiment of the invention.
Figure 11:
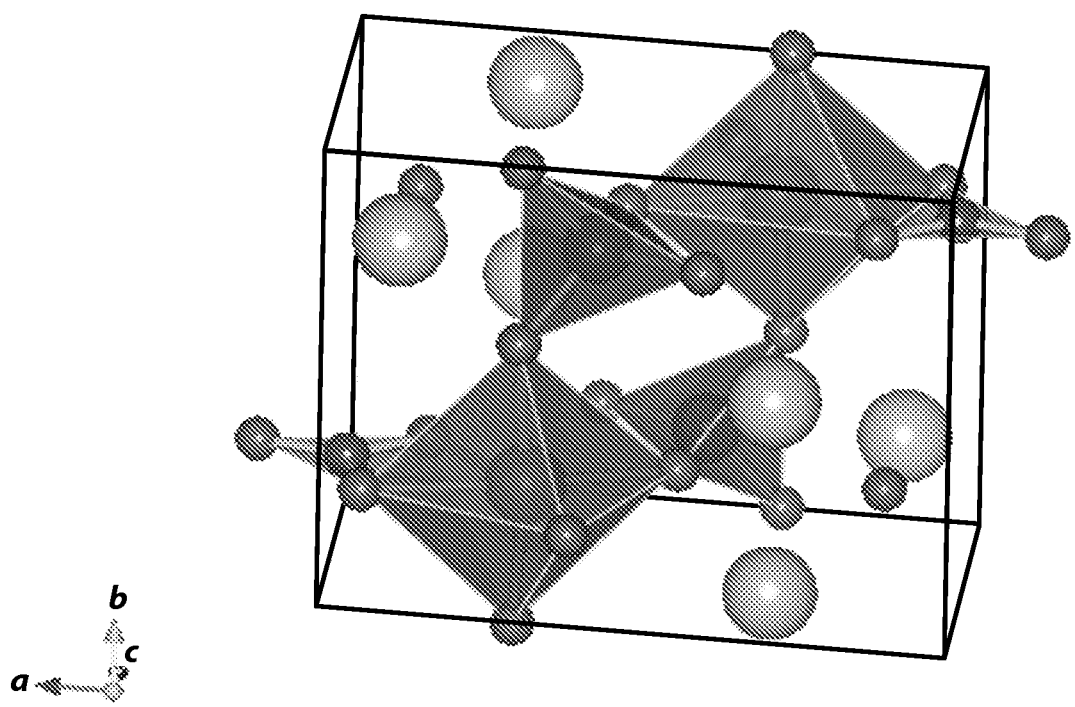
FIG. 11 illustrates a crystal until cell of $Li_3V(CO_3)(SiO_4)$, in yet another embodiment of the invention.

A computational search for other possible stable polyanionic mixtures was also performed. For instance, every possible compound in the formula $A_3M(XO_4)(YO_3)$, where x is 1, 2, or 3; A is Na or Li; X is Si, P, As, or S; and Y is B or C was computed. It was found that certain Na compounds were stable. For instance, the stable compounds in the Na carbonophosphate chemistries were also stable in the corresponding carbonoarsenate chemistries. Similarly, some Na boratophosphates were also found to be close to stability in the formula $Na_3M(PO_4)(BO_3)$, where M is Fe, Mn, or Mo. Certain carbonosilicates such as $Na_3M(SiO_4)(CO_3)$, where M is Fe, Mo, or V were also found to be stable. The stability data for these compounds is shown in FIG. 9 for A=Na and FIG. 10 for A=Li, for the various ions as shown on the X and Y axes. "n/a" means no data is available. In these figures, the gray scale is shaded to illustrate the differential energy of these compounds to the combination of phases with the lowest energy. The voltages for the Li version for those carbonosilicates (i.e., $Li_3M(SiO_4)(CO_3)$) were evaluated and are shown in FIG. 8. For example, $Li_3V(CO_3)(SiO_4)$ has a gravimetric energy density of 799 Wh/kg and volumetric energy density of 2183 Wh/l. FIG. 11 shows the unit cell of this compound.

Figure 7:
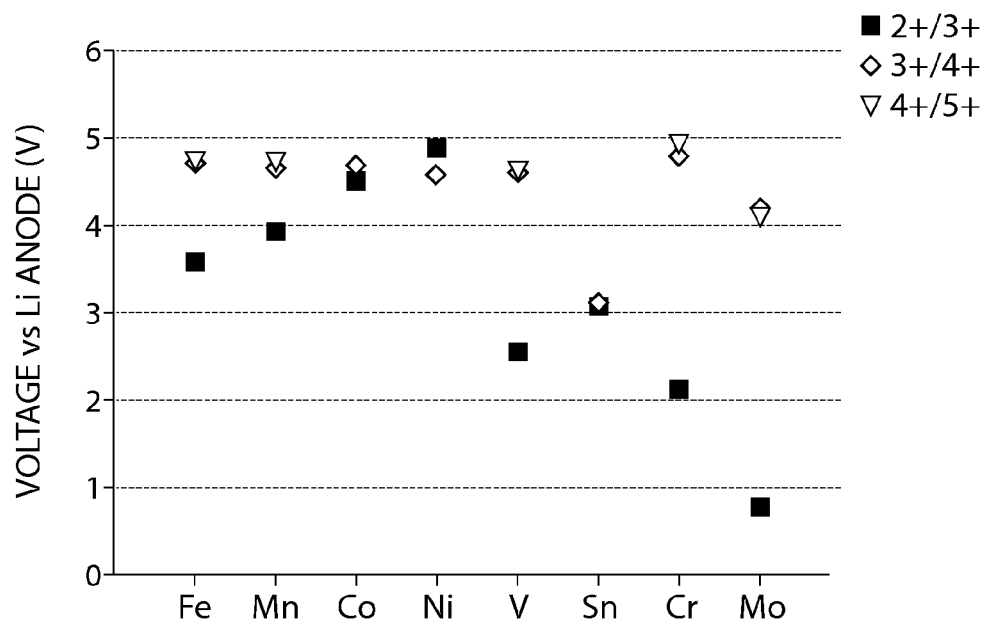
FIG. 7 illustrates voltages for various carbosulfate compounds, in yet another embodiment of the invention.

Other interesting crystal structures include those analogous to ferrotychite ($Na_6Fe_2(CO_3)_4(SO_4)$). Voltages for lithium analogues ($Li_6M_2(CO_3)_4(SO_4)$) are shown in FIG. 7. The voltages tended in general to be higher than the carbonophosphates for the same redox couple.

Example 4

In this example, various sodium carbonophosphate compounds were tested as cathode materials for sodium-ion batteries. Testing conditions were similar to those used in Example 2, except for that Na metal was used as the anode instead of Li metal in Example 2 and 1 M $NaPF_6$ in 1:1 EC/DMC (ethylene carbonate/dimethyl carbonate) solution was used as electrolyte.

Figure 12A:
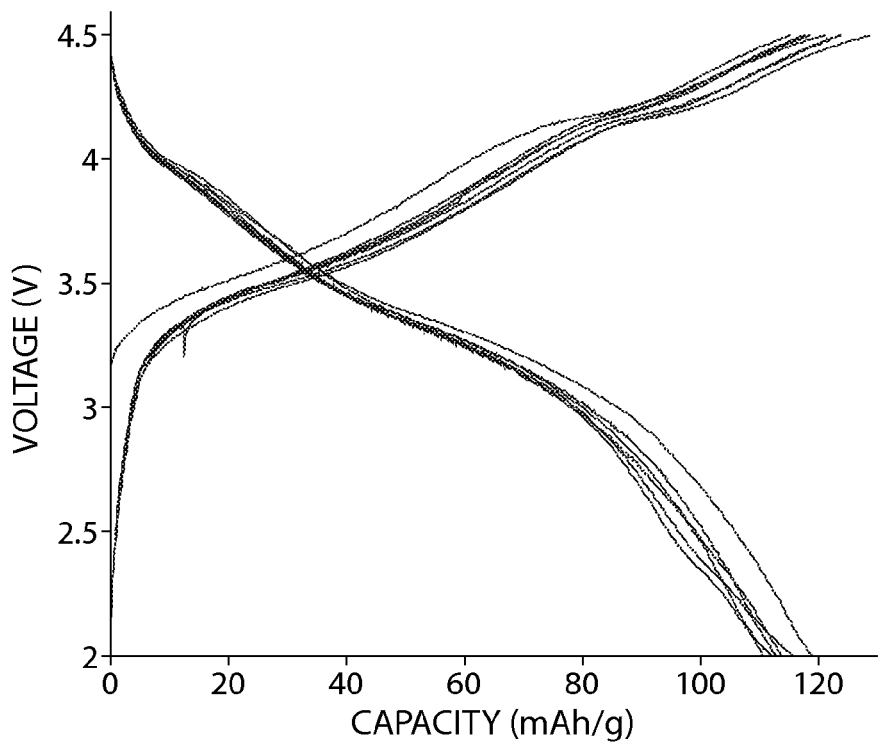
FIGS. 12A-12B illustrate cycling curves and capacities of $Na_3MnPO_4CO_3$, in accordance with some embodiments of the invention.
Figure 12B:
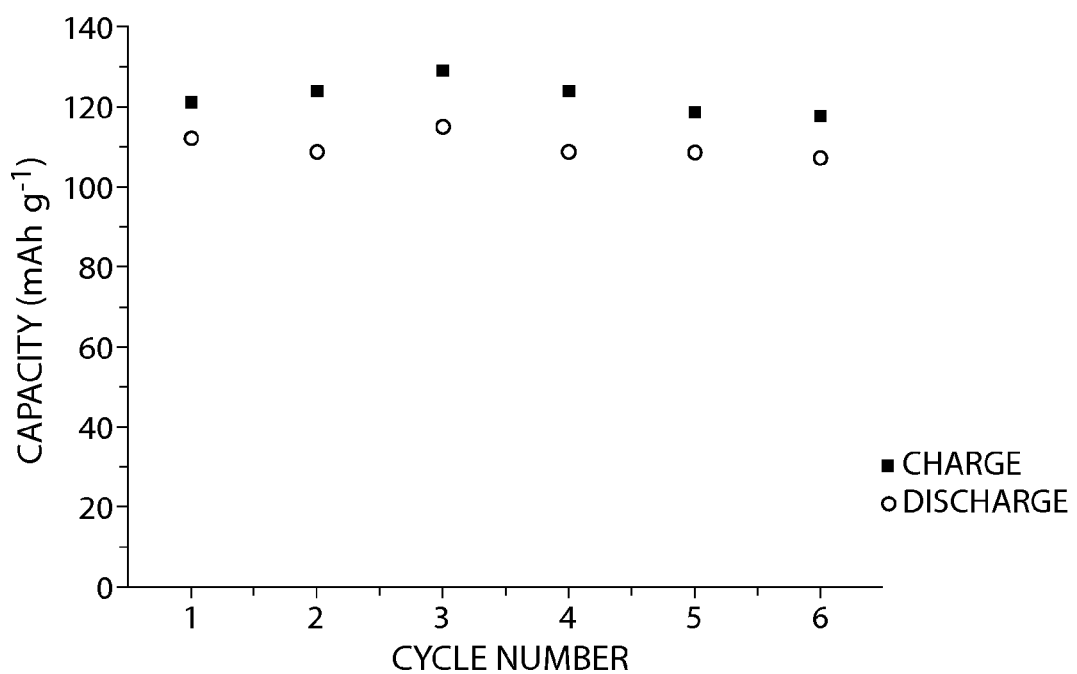

$Na_3MnPO_4CO_3$ showed relatively good capacity (~120 mAh/g), more the theoretical capacity of one-electron reaction (~95 mAh/g) and the discharge curve showed two plateaus, which indicates a possible two-electron reaction. The voltage of the plateaus, centered around 4 V and 3.2 V, generally agreed with computational predictions (4.0V for $Mn^{3+}$/$Mn^{4+}$ and 3.1 V for $Mn^{2+}$/$Mn^{3+}$). The cycling curves and capacities of $Na_3MnPO_4CO_3$ are shown in FIGS. 12A and 12B.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A compound, having a formula:

$$A_x(M)(PO_4)_a(CO_3)_b,$$

wherein:
A comprises one or more alkali metals,
M comprises one or more non-alkali metal cations, wherein at least about 25 mol % of M comprises one or more non-alkali/non-alkaline earth metals,
x is greater than about 0.1,
a is between about 0.1 and about 5.1, and
b is between about 0.1 and about 5.1,
with the proviso that the compound is not one wherein when A is Na, x is between 2 and 4, and M is Fe, Mg, Mn, or Sr.

2. The compound of claim 1, wherein M comprises an alkaline earth metal.

3. The compound of claim 1, wherein M comprises one or more bivalent or trivalent cations.

4. The compound of claim 1, wherein M comprises a transition metal.

5. The compound of claim 1, wherein M comprises one or more of Fe, Mn, Co, Ni, V, Cr, Cu, Ti, Bi, Sn, Sb, or Mo.

6. The compound of claim 1, wherein the compound has a unit cell atomic arrangement that is isostructural to a sidorenkite unit cell, a bonshtedtite unit cell, or a bradleyite unit cell, a crawfordite unit cell, or a ferrotychite unit cell.

7. The compound of claim 1, wherein A is Li.

8. An electrochemical device, comprising an electrode comprising a lithium-containing compound, the compound having a formula:

$$Li_x(M)(PO_4)_a(CO_3)_b,$$

wherein:
M comprises one or more non-alkali metal cations, wherein at least about 25 mol % of M comprises one or more non-alkali/non-alkaline earth metals, wherein the lithium-containing compound has a unit cell containing $CO_3$ triangular planar groups, $PO_4$ tetrahedral groups, and $MO_6$ octahedral groups,
x is greater than about 0.1,
a is between about 0.1 and about 5.1, and
b is between about 0.1 and about 5.1.

* * * * *